US012361390B2

(12) United States Patent
Sikora et al.

(10) Patent No.: US 12,361,390 B2
(45) Date of Patent: Jul. 15, 2025

(54) APPARATUSES, COMPUTER-IMPLEMENTED METHODS, AND COMPUTER PROGRAM PRODUCTS FOR IMPROVED ASSET DEGRADATION MONITORING AND PREDICTION

(71) Applicant: Honeywell International Inc., Charlotte, NC (US)

(72) Inventors: Marek Sikora, Charlotte, NC (US); Eva Jerhotova, Charlotte, NC (US); Zdenek Schindler, Prague (CZ); Jiri Rojicek, Prague (CZ); Jakub Malaník, Chodov (CZ); Frank P. DiMartino, Jr., Hiram, GA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 282 days.

(21) Appl. No.: 18/059,804

(22) Filed: Nov. 29, 2022

(65) Prior Publication Data
US 2024/0005287 A1    Jan. 4, 2024

Related U.S. Application Data

(60) Provisional application No. 63/367,427, filed on Jun. 30, 2022.

(51) Int. Cl.
*G06Q 30/00* (2023.01)
*G06Q 10/20* (2023.01)

(52) U.S. Cl.
CPC .................................. *G06Q 10/20* (2013.01)

(58) Field of Classification Search
None
See application file for complete search history.

(56) References Cited

U.S. PATENT DOCUMENTS

| | | | |
|---|---|---|---|
| 2021/0190563 A1* | 6/2021 | Day | G05D 7/0635 |
| 2022/0284278 A1* | 9/2022 | Tang | G06N 3/08 |
| 2023/0022733 A1* | 1/2023 | Kaul | G05B 13/028 |
| 2023/0067235 A1* | 3/2023 | Baumgartner | G05B 17/02 |

OTHER PUBLICATIONS

Optimal Operating Conditions and Security Considerations for Optical Chaos Communications, Author: Priyadarshi, Sanjay, Publication info: Bangor University (United Kingdom), ProQuest Dissertations & Theses, 2013. (Year: 2013).*

(Continued)

*Primary Examiner* — Matthew T Sittner
(74) *Attorney, Agent, or Firm* — ALSTON & BIRD LLP

(57) ABSTRACT

Embodiments of the disclosure provide for determination and/or notifying of when an asset requires maintenance. Such embodiments enable outputting notifications in circumstances where tracked data for operations of an asset indicate or are predicted to violate particular thresholds. Some embodiments receive a feedback data set for an asset, identify a command data set for the asset, determine a delay value based at least in part on the feedback data set and the command data set, determine a command-feedback difference value based at least in part on the feedback data set and the command data set, and output a degradation indicator based at least in part on the delay value and the command-feedback difference value.

19 Claims, 17 Drawing Sheets

(56) References Cited

OTHER PUBLICATIONS

Effects of Network Quality on Manually Controlled Remote Robots, Author: Dhaliwal, Prabhjot Singh, Publication info: Carleton University (Canada). ProQuest Dissertations & Theses, 2012. (Year: 2012).*

Direct Continuous-Time Control of Sampled-Data Systems, Author: Galloway, Peter Richard, Publication info: University of Glasgow (United Kingdom). ProQuest Dissertations & Theses, 2000. (Year: 2000).*

European search report Mailed on Feb. 27, 2024 for EP Application No. 23178886, 12 page(s).

* cited by examiner

APPARATUSES, COMPUTER-IMPLEMENTED METHODS, AND COMPUTER PROGRAM PRODUCTS FOR IMPROVED ASSET DEGRADATION MONITORING AND PREDICTION

CROSS REFERENCE TO RELATED APPLICATIONS

This application claims priority to U.S. Provisional Application No. 63/367,427, filed Jun. 30, 2022, which is incorporated herein by reference in its entirety.

TECHNOLOGICAL FIELD

Embodiments of the present disclosure are generally directed to detecting asset degradation and notifying of such degradation, and specifically to utilizing monitored command data and feedback data to detect or predict asset degradation based on determined delay value(s) and command-feedback difference value(s).

BACKGROUND

Operational aspects of an asset often degrade over time. To avoid degraded service or complete failures, maintenance of the asset is often appropriate to resolve such degradation. Practically speaking, however, maintenance cannot be continuously performed, as resource expenditure (including time and personnel) to perform such maintenance is prohibitive.

Applicant has discovered various technical problems associated with conventional detection and notifying of degradation. Through applied effort, ingenuity, and innovation, Applicant has solved many of these identified problems by developing the embodiments of the present disclosure, which are described in detail below.

BRIEF SUMMARY

In general, embodiments of the present disclosure herein provide for improved detecting and notifying of asset degradation. Other implementations for detecting and notifying of asset degradation will be, or will become, apparent to one with skill in the art upon examination of the following figures and detailed description. It is intended that all such additional implementations be included within this description be within the scope of the disclosure, and be protected by the following claims.

In accordance with a first aspect of the disclosure, a computer-implemented method for improved degradation monitoring is provided. The computer-implemented method is executable utilizing any of a myriad of computing device(s) and/or combinations of hardware, software, firmware. In some example embodiments an example computer-implemented method includes identifying a command data set associated with the asset. The example computer-implemented method further includes identifying a feedback data set associated with an asset. The example computer-implemented method further includes determining a delay value associated with the command event based at least in part on the feedback data set. The example computer-implemented method further includes determining a command-feedback difference value. The command-feedback difference value in some example embodiments is based at least in part on a first portion of feedback data from the feedback data set and a first portion of command data set, the first portion of the feedback data and the first portion of the command data associated with at least one timestamp determined as after an end of a command event. The example computer-implemented method further includes outputting a degradation indicator based at least in part on the delay value and/or the command-feedback difference.

In some example embodiments, the example computer-implemented method further includes determining delay status data based at least in part on comparison between the delay value and a delay threshold, and outputting the degradation indicator based at least in part on the delay status data.

In some example embodiments, the example computer-implemented method further includes determining difference status data based at least in part on comparison between the command-feedback difference value and a difference threshold, and outputting the degradation indicator based at least in part on the difference status data.

In some example embodiments, identifying the feedback data set includes capturing, via at least one sensor corresponding to the asset, feedback data indicating a current operational value for an operational aspect of the asset. In some such example embodiments, the at least one sensor capture the feedback data at a sampling rate based at least in part on an asset type associated with the asset.

In some example embodiments, the example computer-implemented method further includes determining, based at least in part on the delay value, a normalized delay value, and outputting the degradation indicator based at least in part on the normalized delay value.

In some example embodiments, the example computer-implemented method further includes generating delay trend data based at least in part on the delay value, and generating, using a threshold timing prediction model, a predicted time remaining until a delay threshold is satisfied based at least in part on the delay trend data. In some such example embodiments, the threshold timing prediction model includes at least one machine learning model trained to generate, based at least in part on the delay value, the predicted time remaining until the delay threshold is satisfied.

In some example embodiments, the example computer-implemented method further includes generating difference trend data based at least in part on the command-feedback difference value, and generating, using a threshold timing prediction model, a predicted time remaining until a difference threshold is satisfied based at least in part on the difference trend data. In some such example embodiments, the threshold timing prediction model includes at least one machine learning model trained to generate, based at least in part on the command-feedback difference value, the predicted time remaining until the difference threshold is satisfied.

In some example embodiments, the example computer-implemented method further includes determining an update ending feedback data from the feedback data set, the update ending feedback data indicating the end of the command event, and determining the delay value based at least in part on the update ending feedback data. In some such example embodiments, determining the update ending feedback data includes determining a first timestamp associated with a first data value, wherein, after the first timestamp, data values in the feedback data set remain within a tolerance threshold for a timestamp interval that satisfies a value updating time threshold.

In some example embodiments, the command data set includes data values within a range of operable values associated with the asset.

In some example embodiments, the feedback data set includes feedback data representing a speed of operation of the asset or a position of operation of the asset.

In some example embodiments, outputting the degradation indicator includes causing output of a maintenance notification to a user device associated with the asset, the maintenance notification indicating that the asset requires maintenance or a time remaining until the asset should undergo maintenance.

In accordance with another aspect of the present disclosure, an apparatus for improved degradation monitoring is provided. The apparatus in some embodiments includes at least one processor and at least one non-transitory memory, the at least non-transitory one memory having computer-coded instructions stored thereon. The computer-coded instructions in execution with the at least one processor causes the apparatus to perform any one of the example computer-implemented methods described herein. In some other embodiments, the apparatus includes means for performing each step of any of the computer-implemented methods described herein.

In accordance with another aspect of the present disclosure, a computer program product for improved degradation monitoring is provided. The compute program product in some embodiments includes at least one non-transitory computer-readable storage medium having computer program code stored thereon. The computer program code in execution with at least one processor is configured for performing any one of the example computer-implemented methods described herein.

BRIEF DESCRIPTION OF THE DRAWINGS

Figure 1:
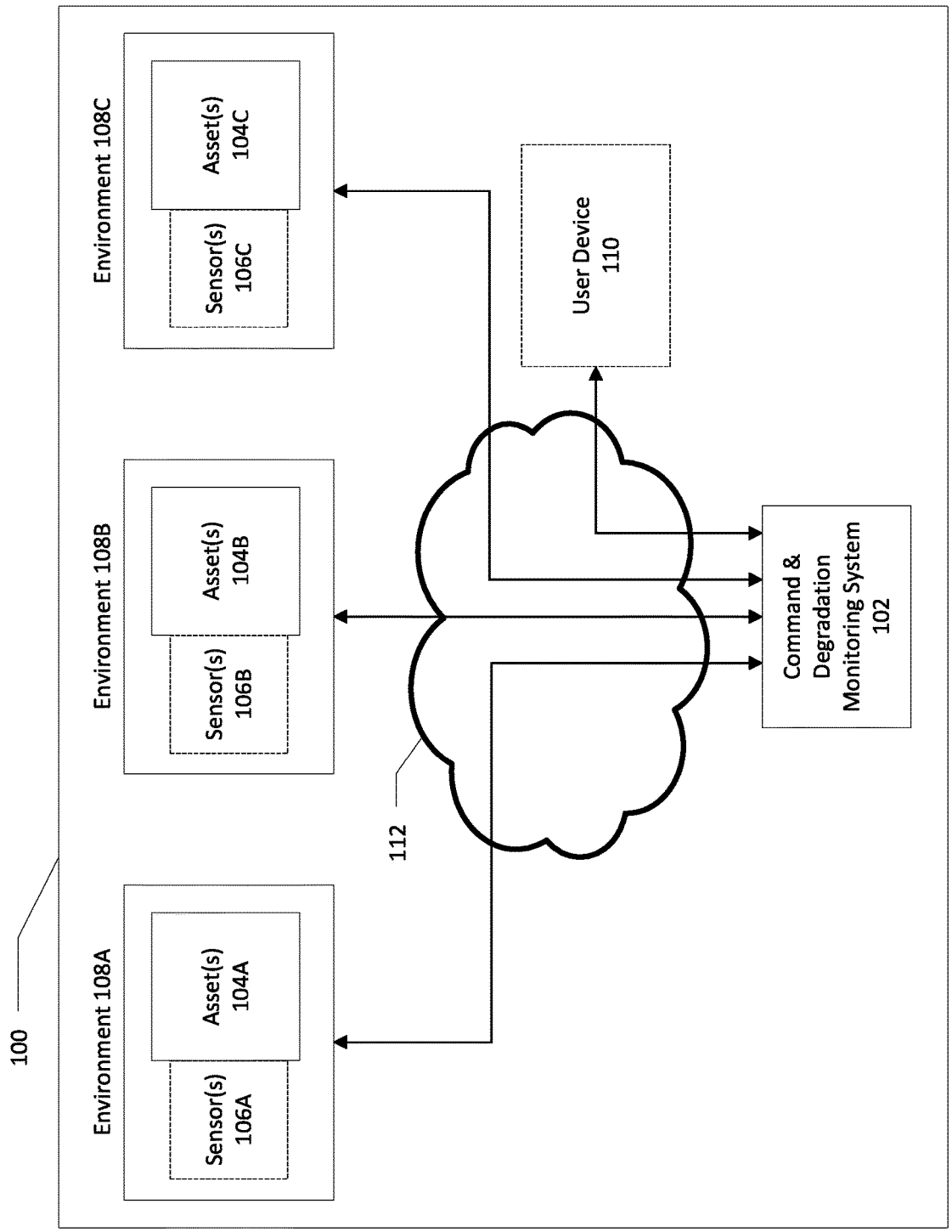
Figure 2:
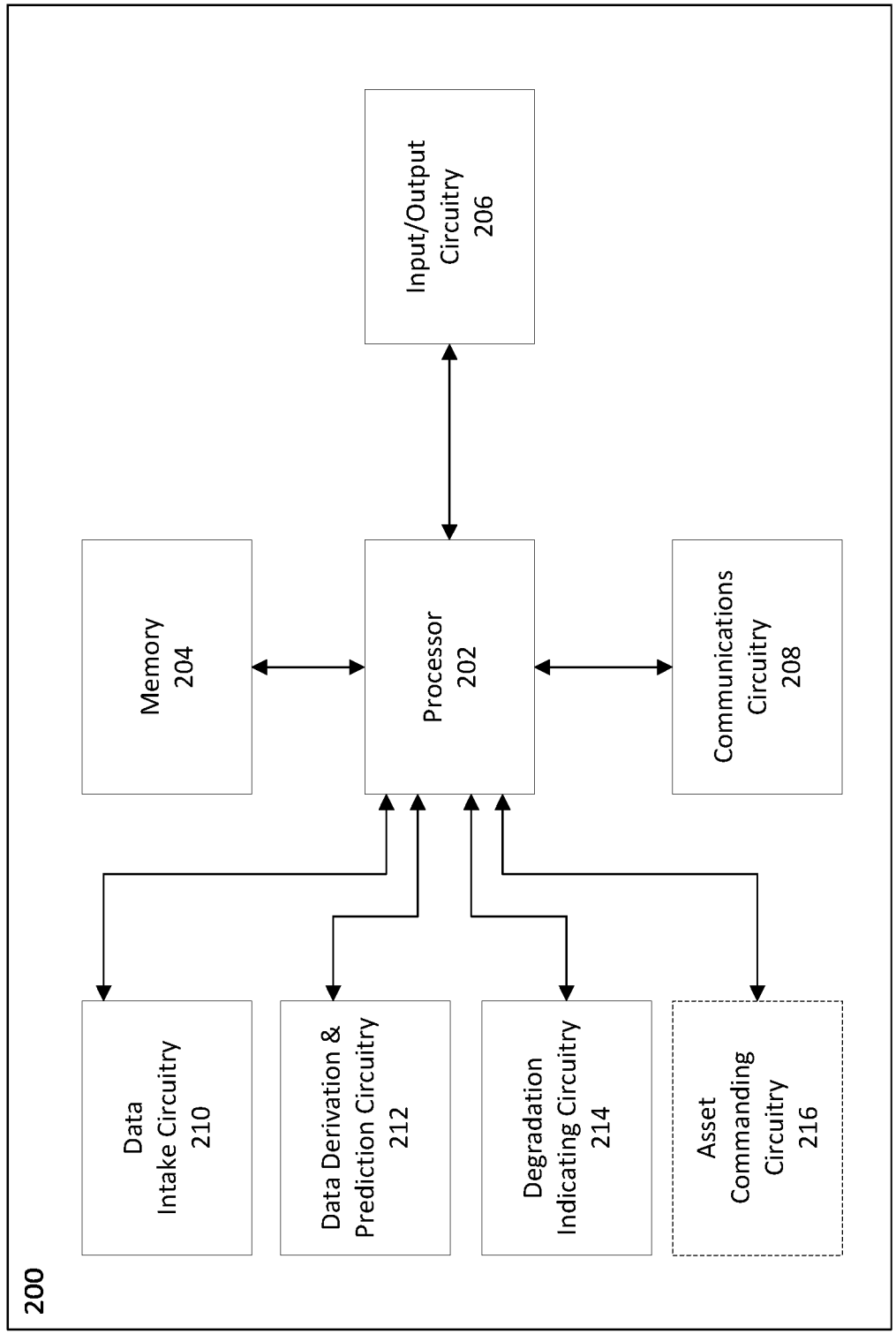
Figure 3:
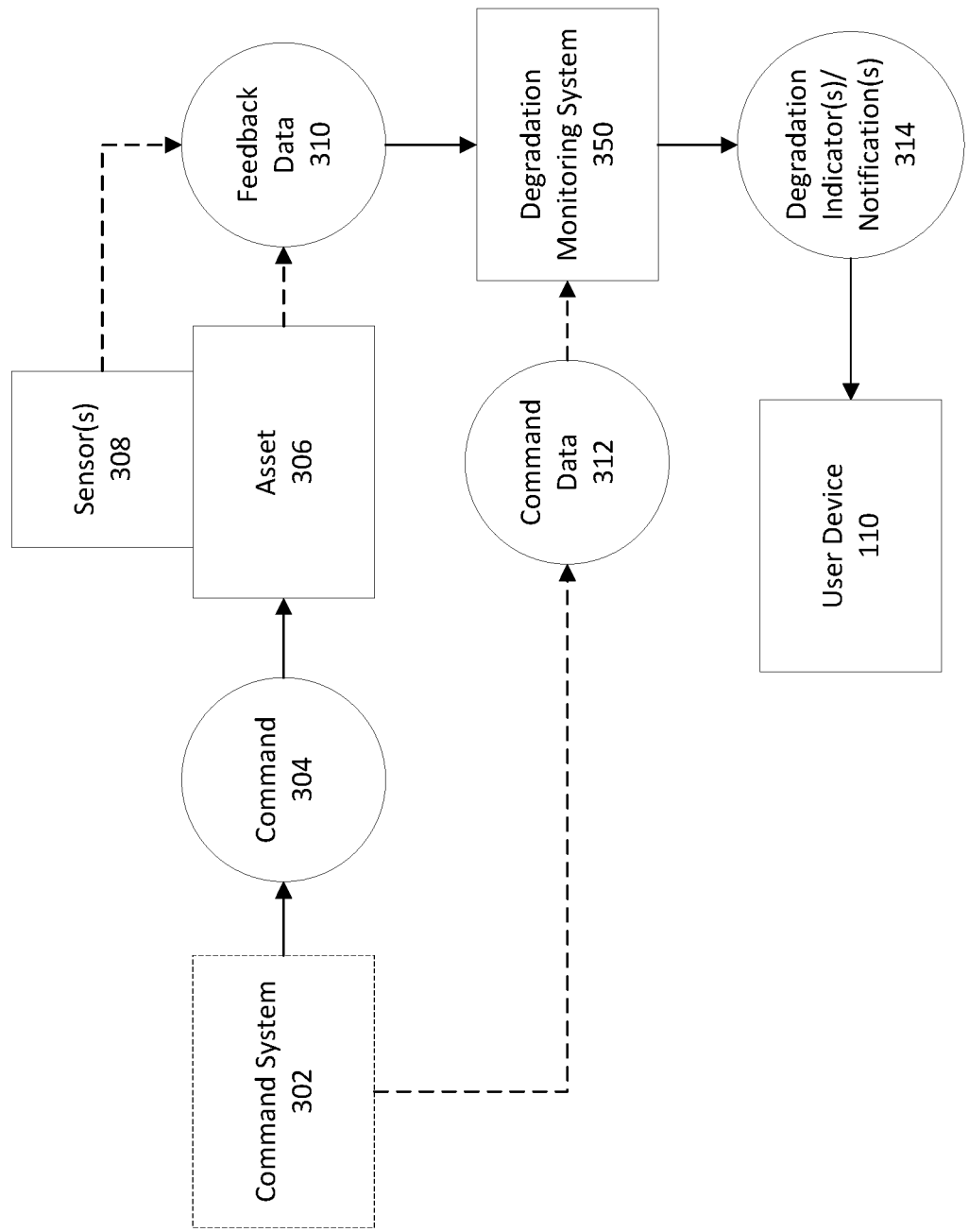
Figure 4:
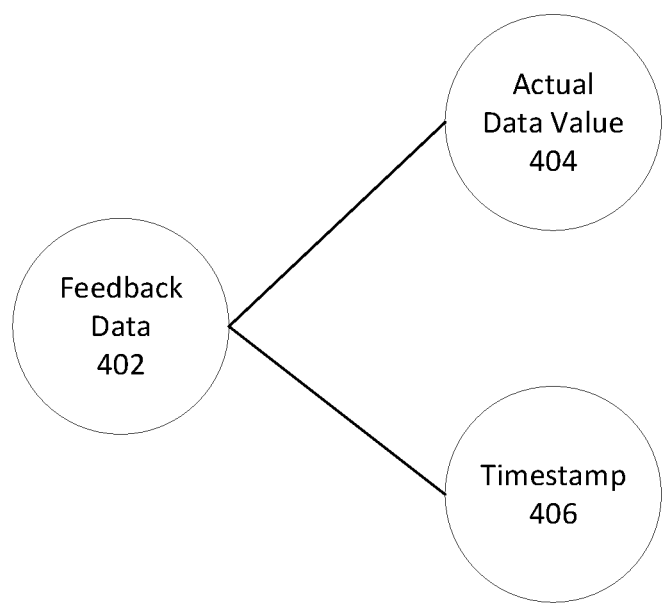
Figure 4:
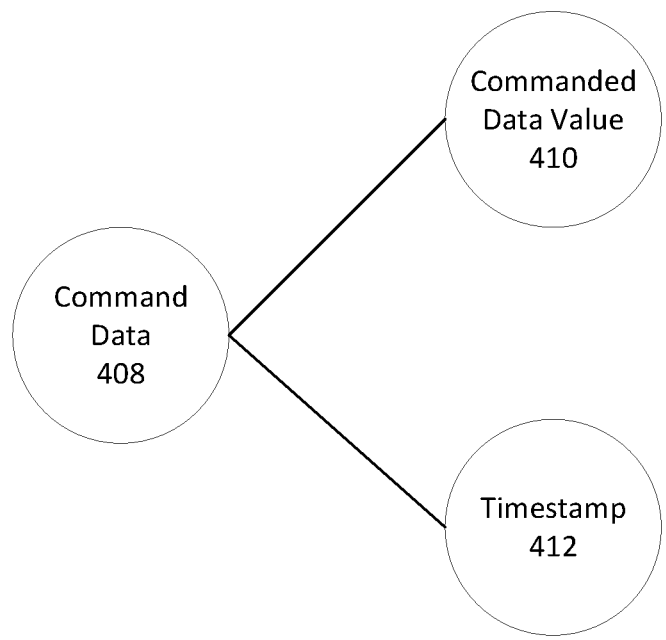
Figure 5:
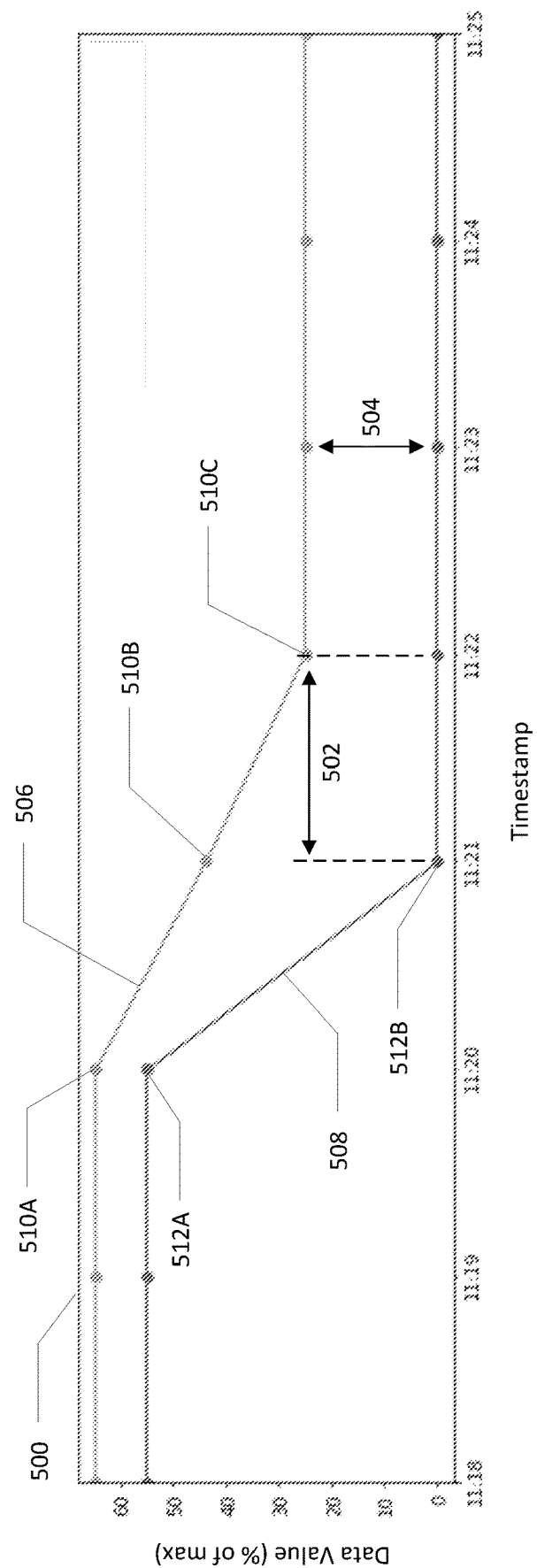
Figure 6:
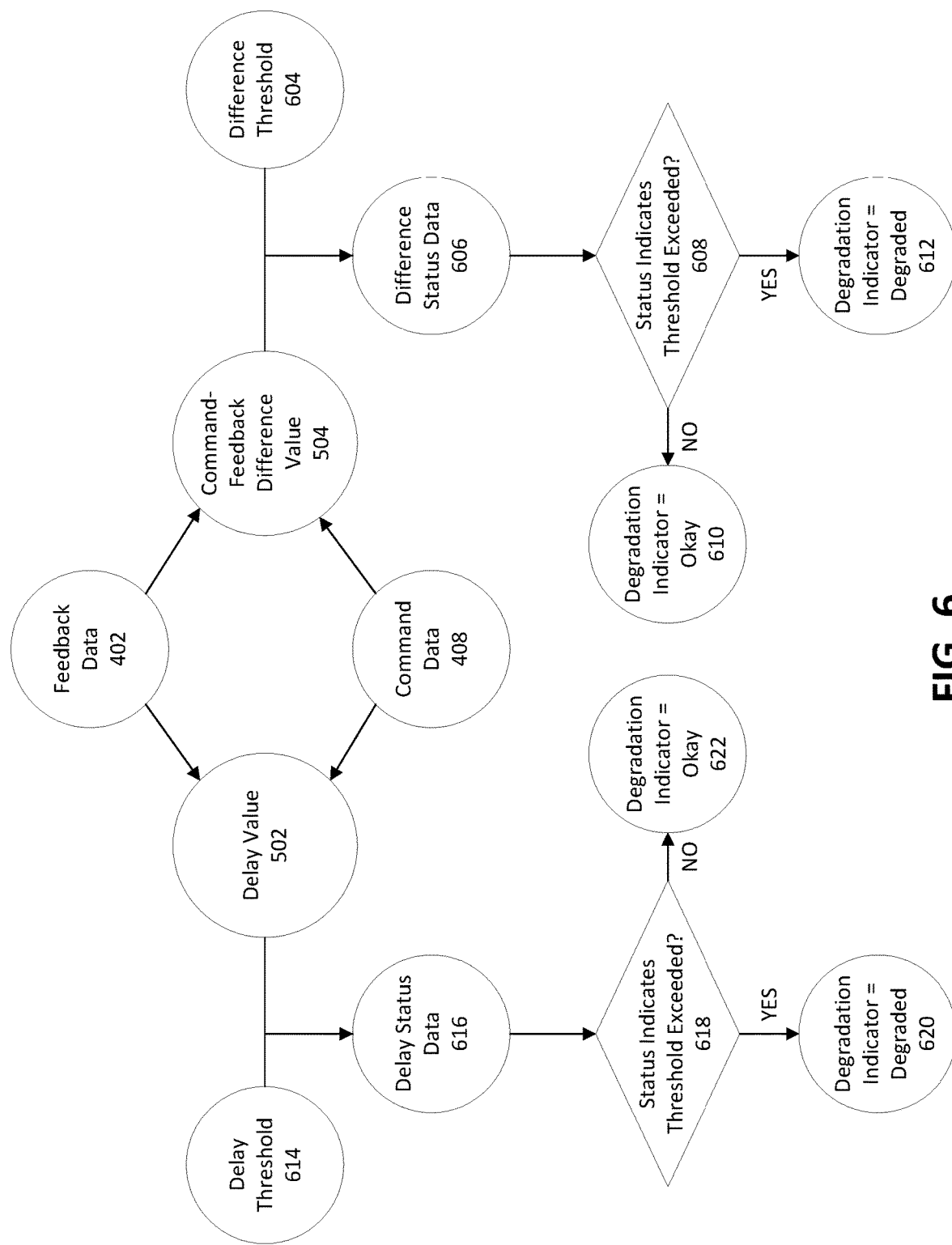
Figure 7:
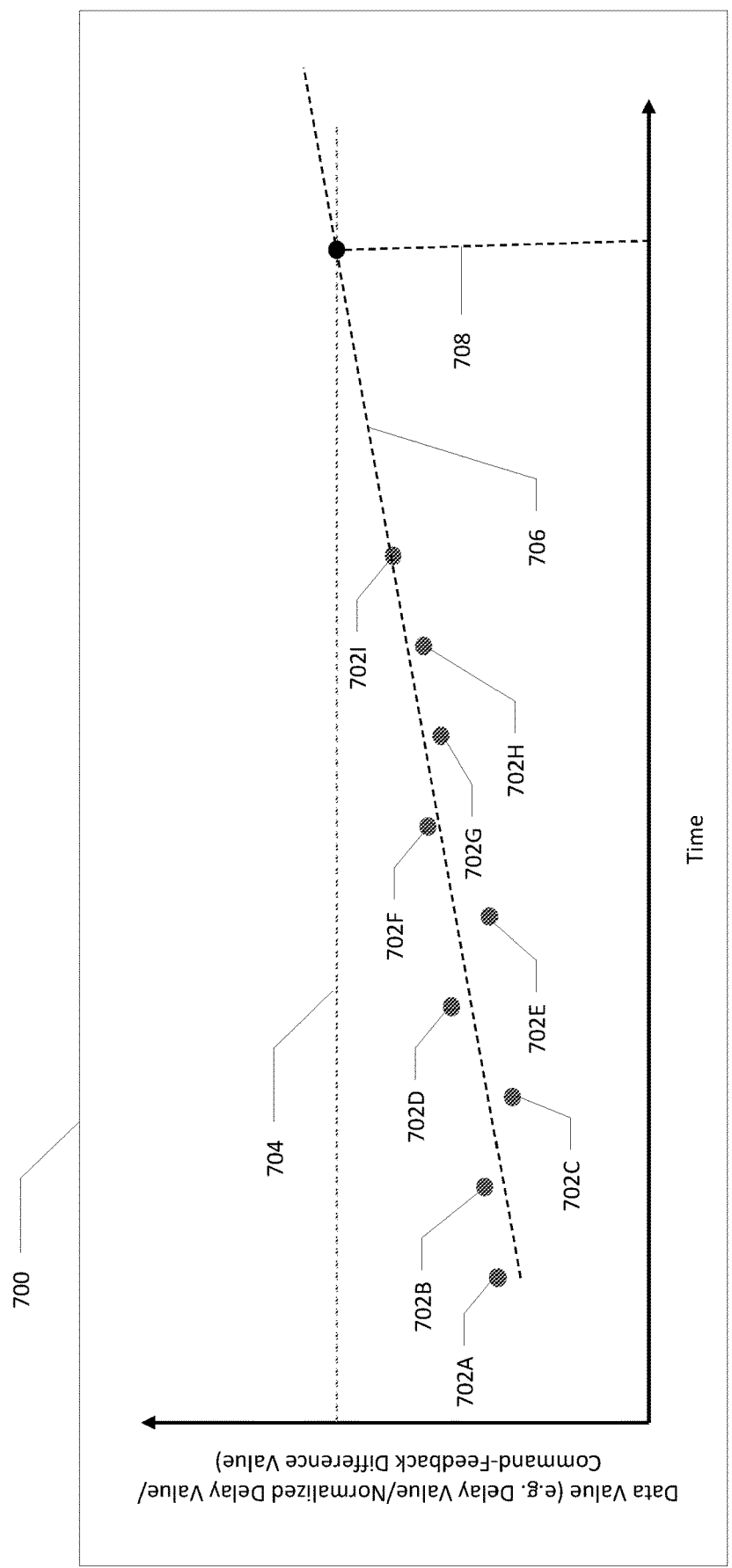
Figure 8A:
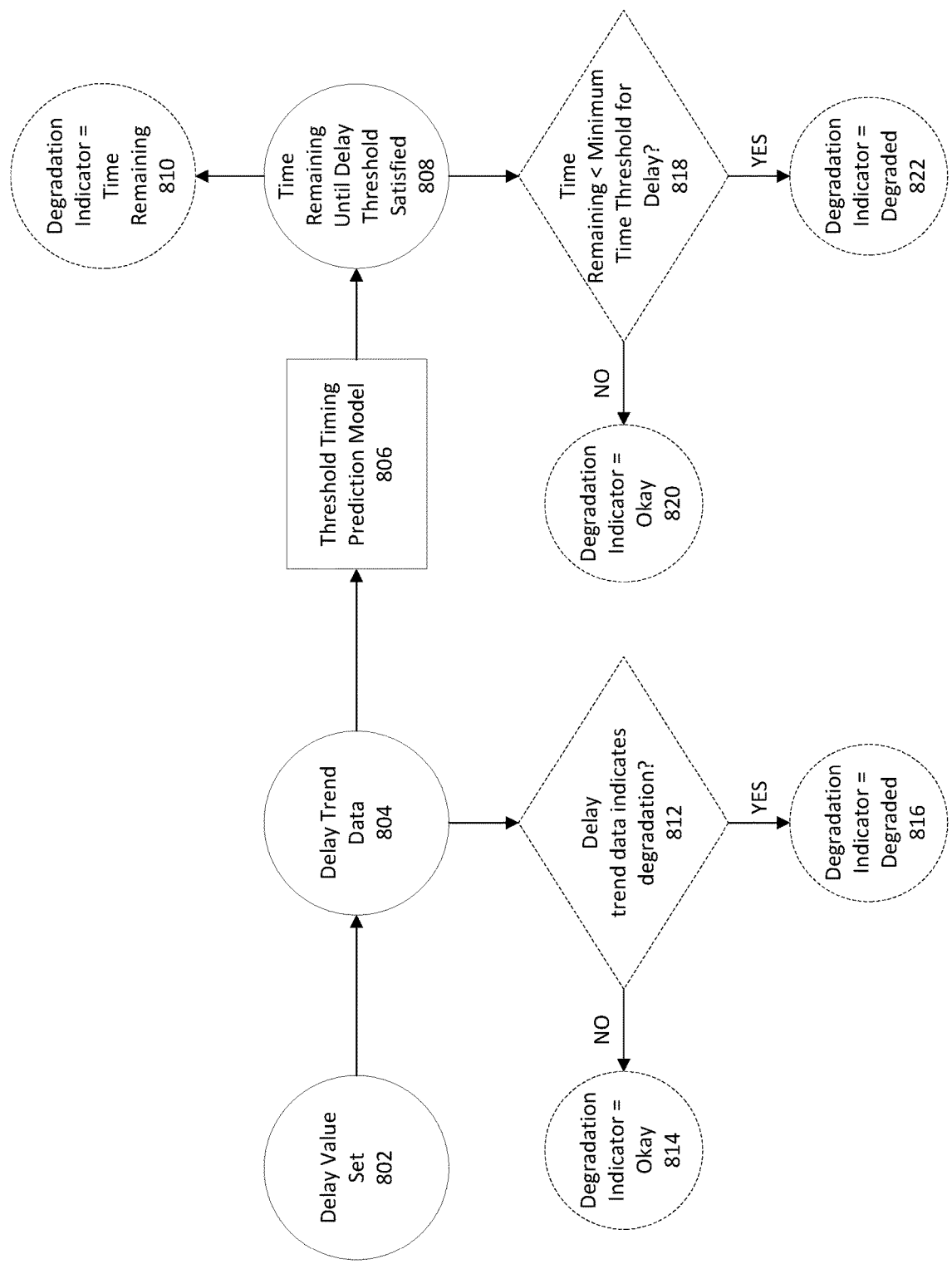
Figure 8B:
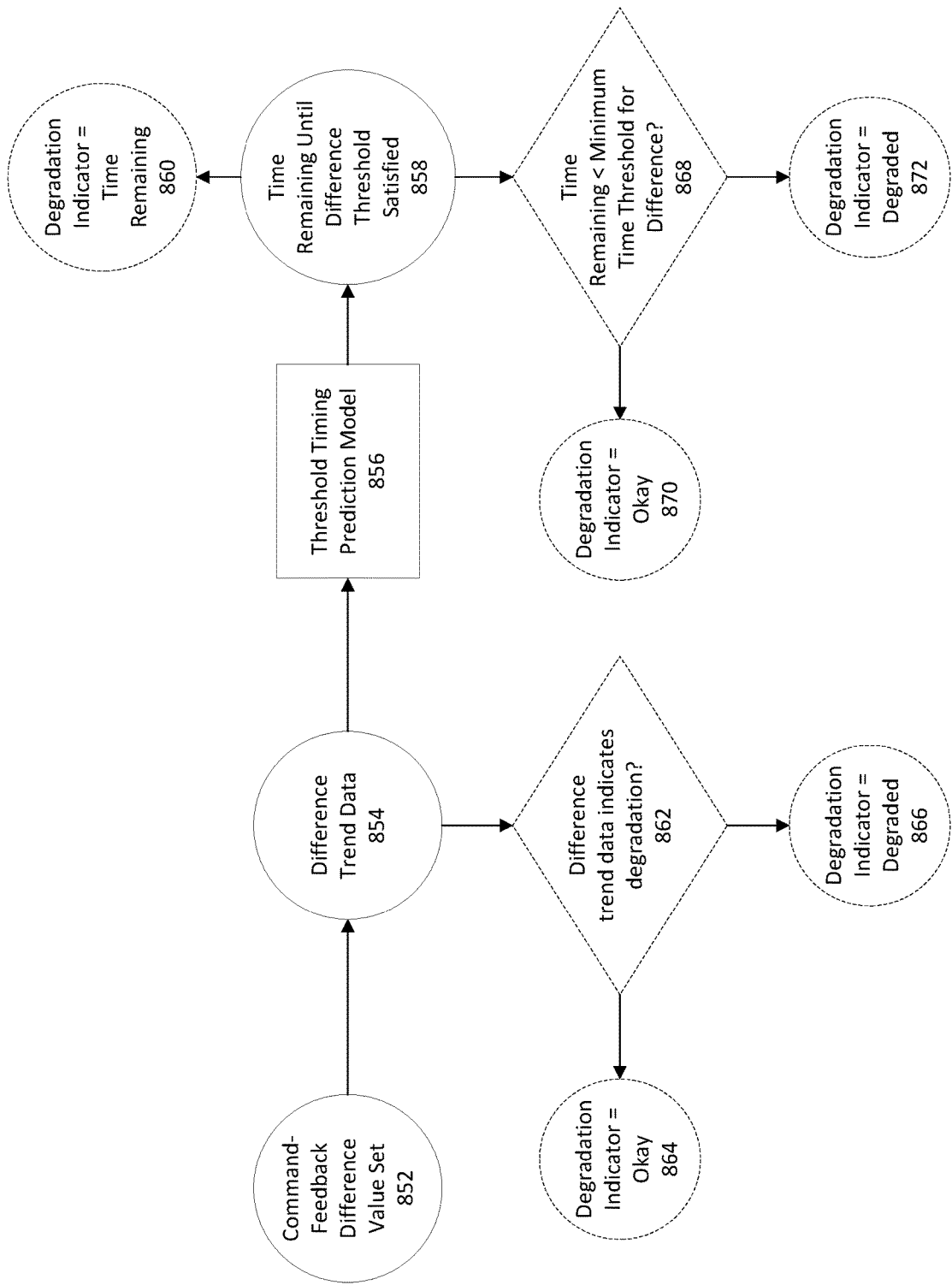
Figure 9:
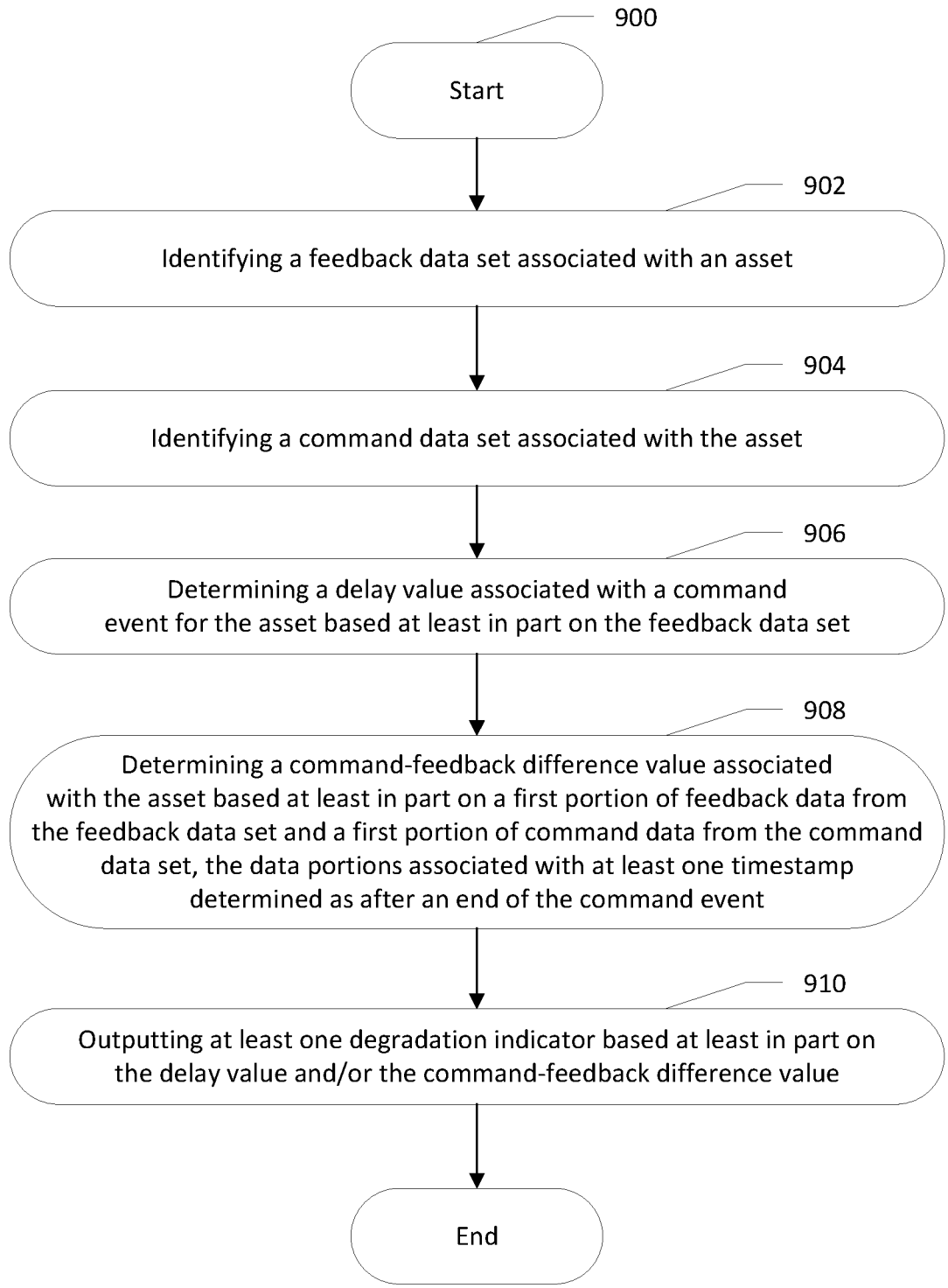
Figure 10:
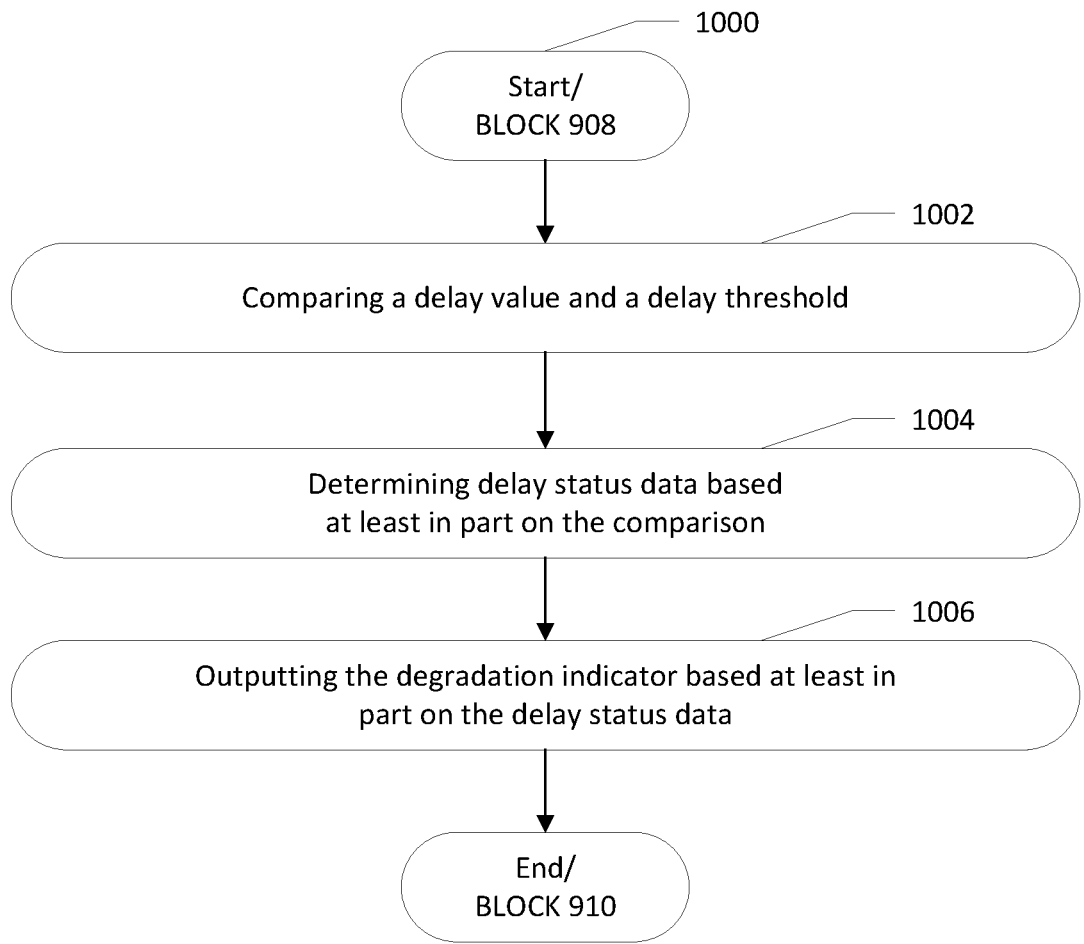
Figure 11:
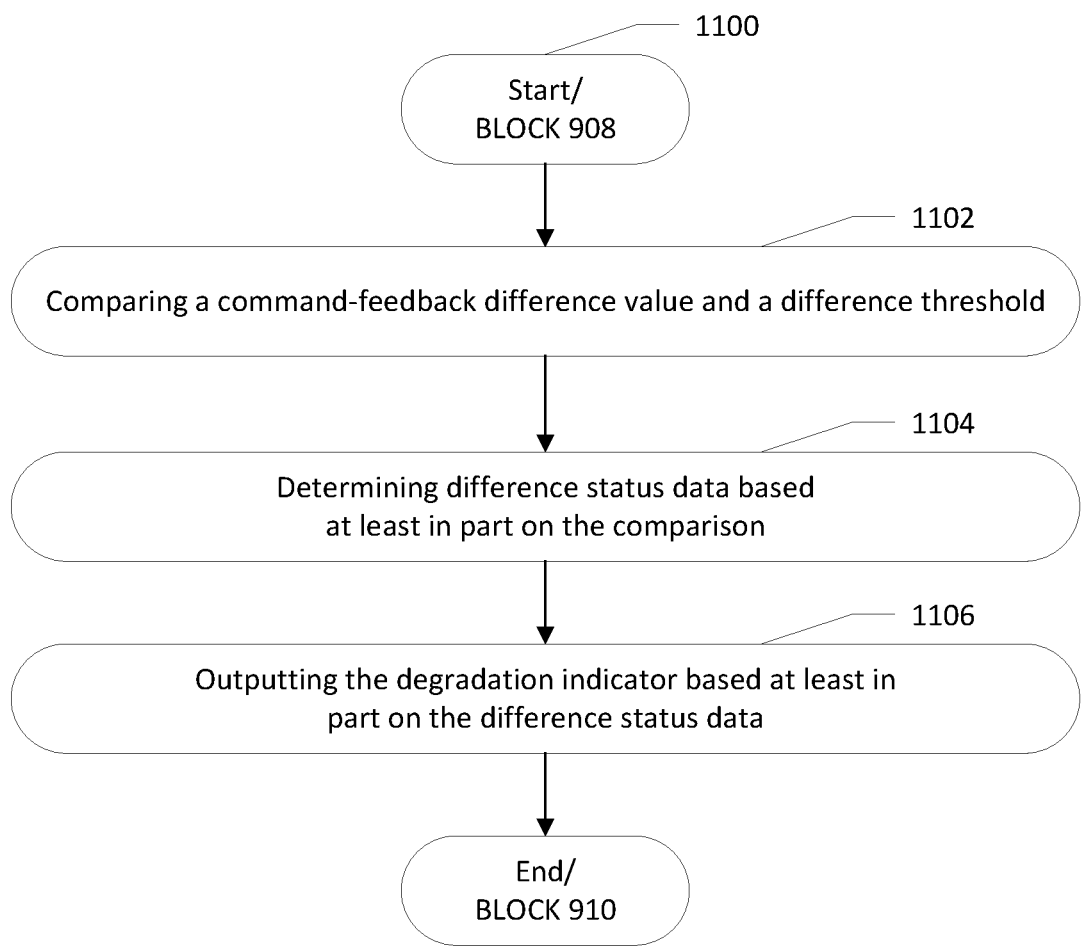
Figure 12:
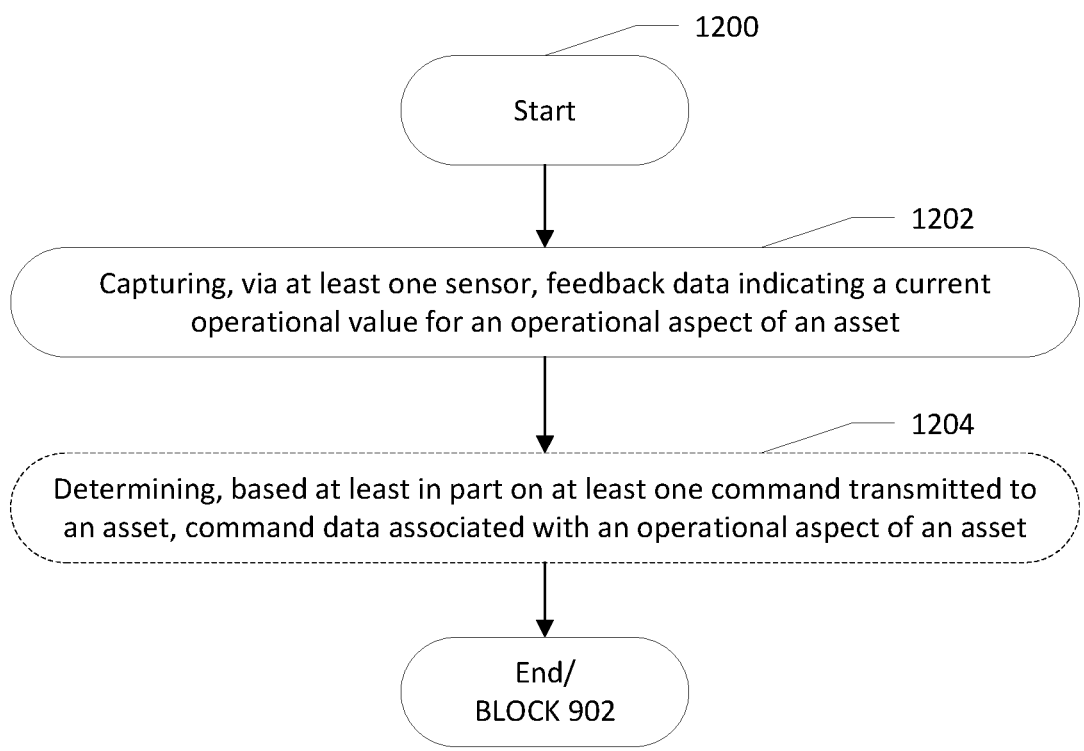
Figure 13:
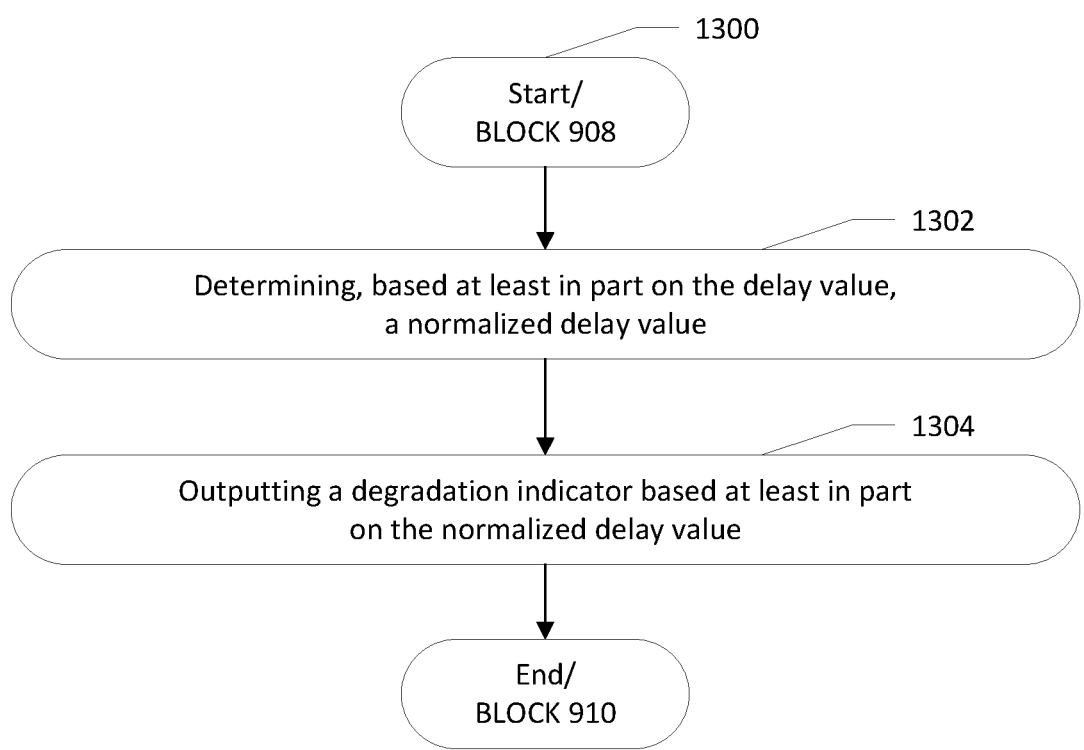
Figure 14:
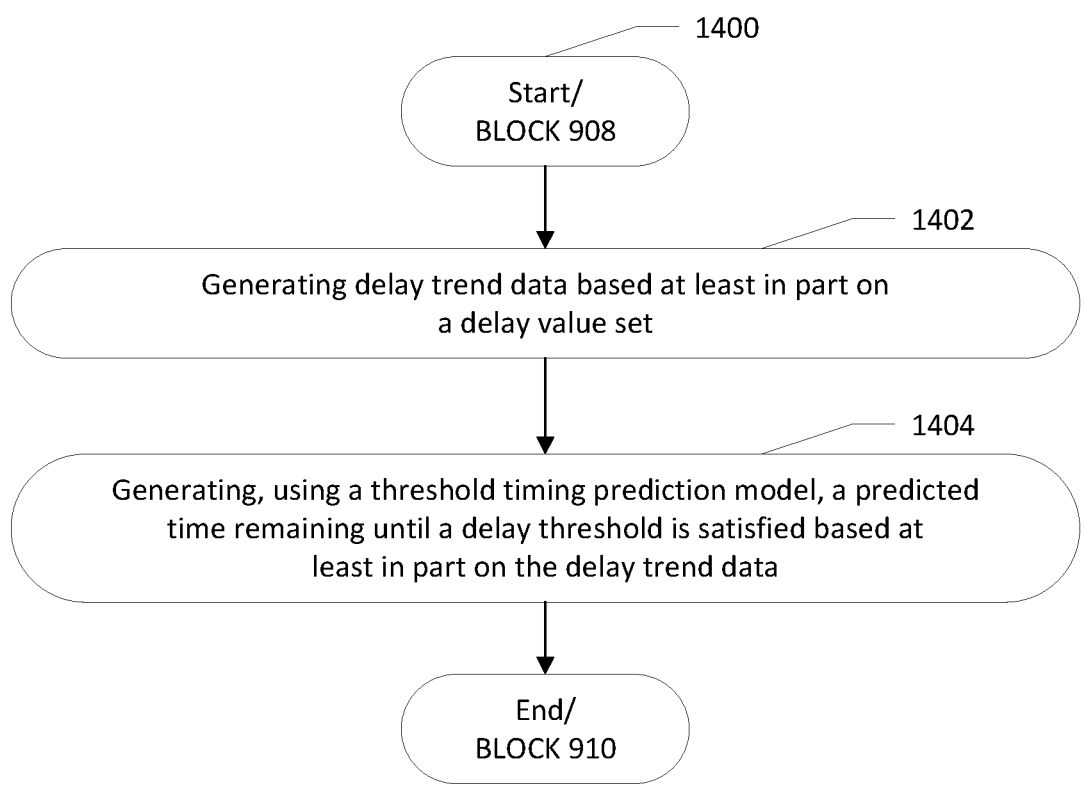
Figure 15:
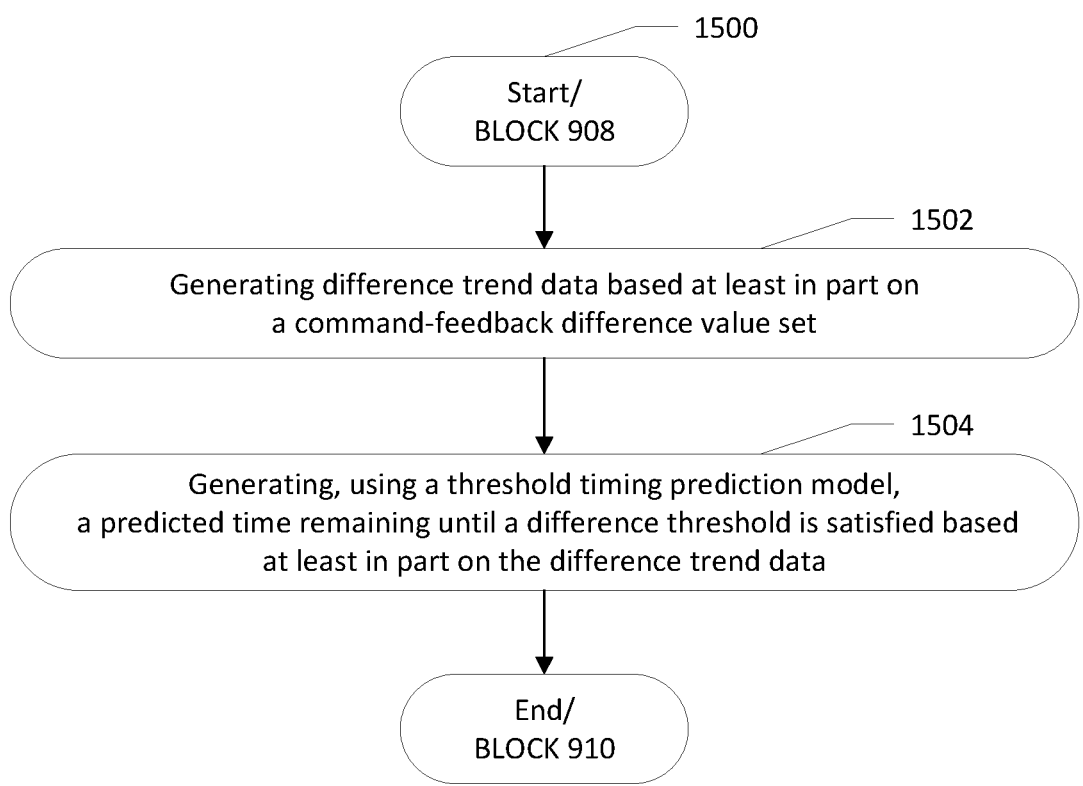
Figure 16:
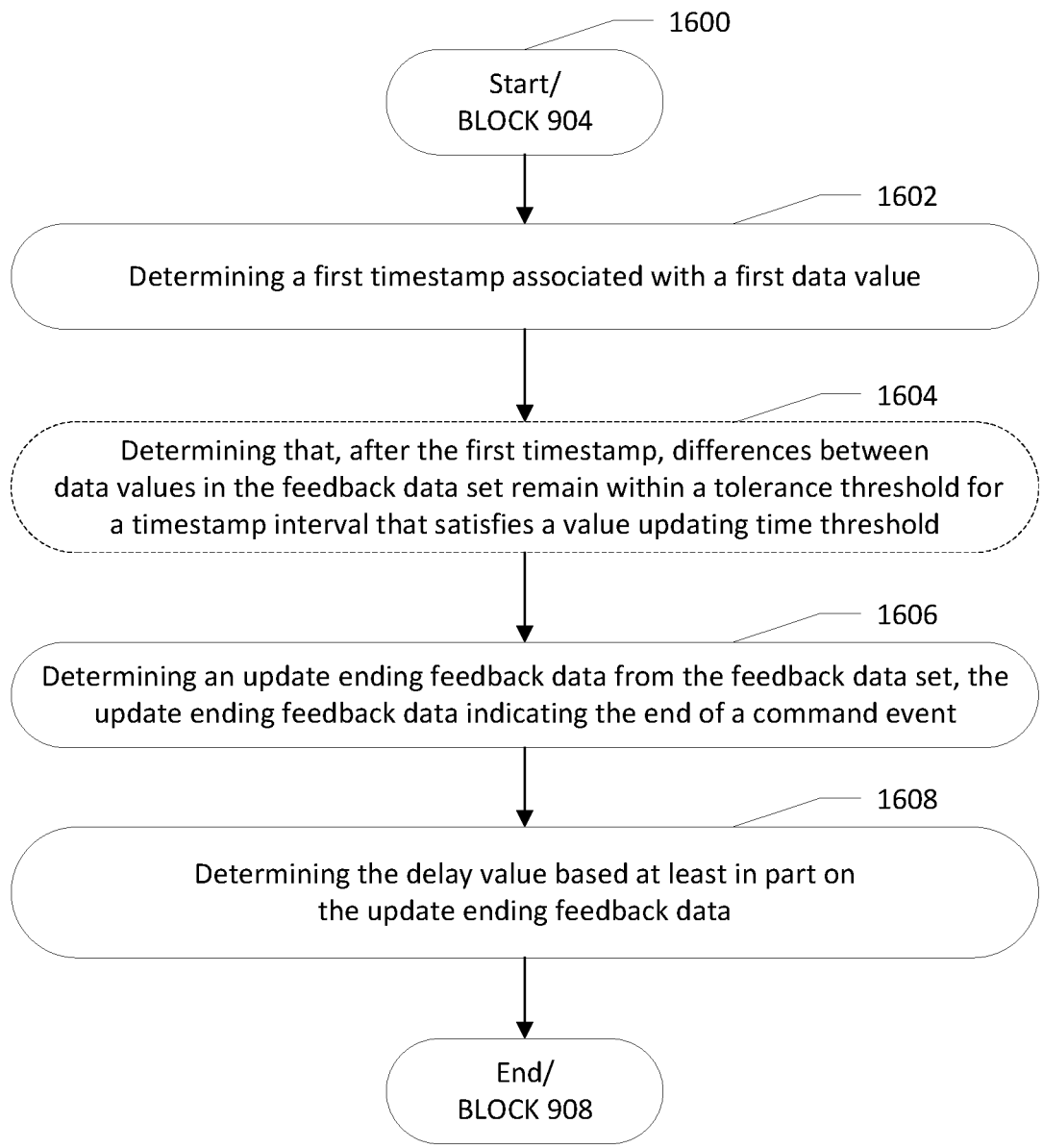

Having thus described the embodiments of the disclosure in general terms, reference now will be made to the accompanying drawings, which are not necessarily drawn to scale, and wherein:

FIG. 1 illustrates a block diagram of a system that may be specially configured within which embodiments of the present disclosure may operate;

FIG. 2 illustrates a block diagram of an example apparatus that may be specially configured in accordance with at least some example embodiments of the present disclosure;

FIG. 3 illustrates an example data flow in accordance with at least some example embodiments of the present disclosure;

FIG. 4 illustrates an example data architecture in accordance with at least some example embodiments of the present disclosure;

FIG. 5 illustrates an example graphical representation of received a command data set and a feedback data set in accordance with at least some example embodiments of the present disclosure;

FIG. 6 illustrates an example data flow for outputting degradation indicator(s) based on an delay value and/or a command-feedback difference value in accordance with at least some example embodiments of the present disclosure;

FIG. 7 illustrates an example graphical representation of trend data and predicted time remaining until a corresponding threshold in accordance with at least some example embodiments of the present disclosure;

FIG. 8A illustrates an example data flow for outputting degradation indicator(s) based on delay trend data in accordance with at least some example embodiments of the present disclosure;

FIG. 8B illustrates an example data flow for outputting degradation indicator(s) based on difference trend data in accordance with at least some example embodiments of the present disclosure;

FIG. 9 illustrates a flowchart depicting operations of an example process for outputting at least one degradation indicator in accordance with at least some example embodiments of the present disclosure;

FIG. 10 illustrates a flowchart depicting operations of an example process for outputting a degradation indicator based at least in part on delay status data in accordance with at least some example embodiments of the present disclosure;

FIG. 11 illustrates a flowchart depicting operations of an example process for outputting a degradation indicator based at least in part on difference status data in accordance with at least some example embodiments of the present disclosure;

FIG. 12 illustrates a flowchart depicting operations of an example process for capturing feedback data in accordance with at least some example embodiments of the present disclosure;

FIG. 13 illustrates a flowchart depicting operations of an example process for outputting a degradation indicator based at least in part on normalized delay value in accordance with at least some example embodiments of the present disclosure;

FIG. 14 illustrates a flowchart depicting operations of an example process for generating a predicted time until a delay threshold is satisfied in accordance with at least some example embodiments of the present disclosure;

FIG. 15 illustrates a flowchart depicting operations of an example process for generating a predicted time until a difference threshold is satisfied in accordance with at least some example embodiments of the present disclosure; and FIG. 16 illustrates a flowchart depicting operations of an example process for determining a delay value in accordance with at least some example embodiments of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

In various contexts, an asset may degrade over time. In some contexts, degradation occurs as a factor of environmental influence on an asset, degradation of materials and/or components of the asset, or simply aging of components of the asset. Degradation of the asset may cause decreased performance of the asset, pose a risk to the safety of an environment, or any of a myriad of additional and/or associated problems. For example, an asset may degrade in a manner that slows changes in one or more operational aspects of the asset.

To avoid the problems associated with asset degradation, it is often desirable to initiate maintenance of assets before degradation reaches a point of affecting operation of the asset by an unacceptable amount. While continuously performing maintenance of an asset may be ideal, it is cost prohibitive and practically impossible due to constraints on the operation of the asset, personnel, and the like. Waiting until an asset malfunctions or completely breaks down, however, is similarly problematic as it may increase the amount of maintenance needed, can completely stall operation of the asset or a related system, or come with any of a number of problems associated with the function of the asset itself. Accordingly, the inventors have identified that it is desirable to accurately determine the effects of degradation on an asset, and further determine and/or predict when an asset may require maintenance due to degradation to prevent effects on operation reaching an unacceptable level. The inventors further identified that current implementations that attempt determination and/or prediction of when to initiate maintenance, however, falls short of doing so in a manner that is sufficiently accurate and accounts for asset degradation.

Embodiments of the present disclosure utilize particular data-driven insights to generate and/or output one or multiple degradation indicator(s) that each indicate whether operation of an asset has degraded to an unacceptable level. Such data-driven insights may be derived from real-time captured and/or otherwise received data regarding the operation of an asset as that asset is commanded (e.g., via transmitted computer program instructions) to change between operational mode(s). In this regard, as an asset is commanded to perform in a particular manner, data associated with such whether the asset is updating its operation as commanded may be monitored and/or processed to determine whether one or more indicators of degradation are present in said data.

Some embodiments of the present disclosure utilize a command-feedback difference value and/or a delay value to output one or more degradation indicator(s). The command-feedback difference value and/or delay value are derivable from capturable data associated with operation of the asset, including command data indicating the data values for a particular data parameter that an asset was commanded to operate at, and/or feedback data indicating the data values for a particular data parameter at which the asset is actually operating. For example, in the context of an asset embodying a valve in an HVAC system, the command data may indicate a valve position at which the valve is commanded to operate, and the feedback data may indicate a valve position at which the valve is actually operating. Such data values may be captured in real-time and tracked across a timeseries for subsequent use in determining the command-feedback difference value and/or delay value.

Some embodiments utilize the command-feedback difference value(s) and/or delay value(s) for comparison to particular thresholds. In this regard, status data is determinable that indicates whether either and/or both of such value(s) indicate the asset has degraded to an unacceptable level. Such determinations are performable in real-time as data is captured associated with the asset, for example via sensor(s) within and/or associated with the asset. In this regard, embodiments of the present disclosure can determine when the real-time operations of the asset indicate current unacceptable degradation.

Additionally or alternatively, some embodiments utilize command-feedback difference value(s) and/or delay value(s) to determine trends associated with such data. In this regard, such trend data may be utilized to determine current and/or future indications of degradation. For example, in some embodiments, trend data is usable to determine whether degradation is indicated based on a current value of the trend data. Alternatively or additionally, for example in some embodiments, trend data is usable to determine a time remaining until a threshold for a particular data value is reached, which indicates an unacceptable level at that future time.

Embodiments of the present disclosure provide a myriad of technical advantages in the technical field of asset operation management, degradation monitoring and predicting, and control systems maintenance. Some embodiments utilize data monitored from operation of an asset to accurately determine the present and/or future level of degradation affecting the asset. The data may be collected in real-time to ensure that accurate determinations are performed based on the latest status of the asset. Some embodiments output various indication(s) and/or notification(s) that indicate degraded operational aspects, notify when maintenance should be performed, and/or otherwise indicate necessary information to a user. Such determinations are performed utilizing different target metrics and data-driven considerations to provide such indications of degradation in a manner that is more accurate than existing attempts at determining asset lifetime.

Definitions

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

"Delay status data" refers to electronically managed data value indicating, based at least in part on a delay threshold, whether a delay value associated with an asset indicates the asset is operating within acceptable boundaries. In some embodiments, delay status data indicates whether a delay value satisfies a delay threshold.

"Delay threshold" refers to a data value indicating a cutoff value for a delay status data, above which a first status is indicated associated with the asset and below which a second status associated with the asset is indicated. In one example embodiment, a delay threshold indicates a maximum acceptable value for delay value before the status of the asset indicates maintenance is appropriate.

"Delay value" refers to electronically managed data representing a timestamp interval between an timestamp at which an asset is commanded to complete a commanded change in operational value and an actual timestamp at which data for the asset indicates the asset completed the commanded change in operational value.

"Asset" refers to any machinery, computer, robot, or component of a system that operates to serve a particular physical function. Non-limiting examples of an asset includes a valve, a damper, a fan, and a pump.

"Asset type" refers to a categorization or other classification of an asset. Non-limiting examples of an asset type include a fan type, a valve type, a damper type, and a pump type.

"Command data" refers to electronically managed data representing a target value associated with operation of an asset at a particular timestamp. Non-limiting examples of command data includes a commanded position value on a percentage scale (e.g., between a 0%/minimum position and a 100%/maximum position), a commanded absolute position value between a minimum position and a maximum position, a commanded speed on a percentage scale (e.g., between a 0%/minimum speed and a 100%/maximum speed), and a commanded absolute speed value between a minimum speed and a maximum speed.

"Command data set" refers to one or more data object(s) including any number of individual portions of command data.

"Command-feedback difference value" refers to electronically managed data representing a difference in a value of command data corresponding to a particular timestamp and a value of feedback data corresponding to the same particular timestamp.

"Command event" and "command" refer to an operational state of an asset in during which a value for an operational parameter of the asset is to update from a starting value to a target value. In one example non-limiting context, a command event represents an initiated process for updating a position of a valve from 0% of a maximum position to 50% of a maximum position over a defined time interval. A command event may be associated with a "start" representing a timestamp that updating of the value for the operational parameter begins for the asset (e.g., the time at which the command is invoked), and an "end" representing a timestamp that updating of the actual value for the operational parameter has completed or ceased sufficiently progressing towards the target value.

"Feedback data" refers to electronically managed data representing a measured value associated with operation of an asset at a particular timestamp. Non-limiting examples of feedback data include a measured position value on a percentage scale (e.g., between a 0%/minimum position and a 100%/maximum position), a measured absolute position value between a minimum position and a maximum position, a measured speed on a percentage scale (e.g., between a 0%/minimum speed and a 100%/maximum speed), and a measured absolute speed value between a minimum speed and a maximum speed.

"Feedback data set" refers to one or more data object(s) including any number of individual portions of feedback data.

"Current operational value" refers to electronically managed data representing a measured value for a particular operational parameter of an asset at a particular timestamp at which the measurement is taken.

"Degradation indicator" refers to electronically managed data indicating whether one or more aspect(s) associated with operation of an asset were determined to be degraded past an acceptable amount based at least in part command data and feedback data associated with the asset. Non-limiting examples of a degradation indicator include a visual indicator, a notification, a sound cue, and/or a data output via a system.

"Delay trend data" refers to electronically managed data representing a determined change in delay values across time. Non-limiting examples of delay trend data include a formula fit to a set of data, a predicted value or values for a particular data parameter based on a set of data, or a plurality of parameters defining a trend in a set of data.

"Difference status data" refers to electronically managed data value indicating, based at least in part on a difference threshold, whether a command-feedback difference value indicates the asset is operating within acceptable boundaries. In some embodiments, difference status data indicates whether a command-feedback difference value satisfies a difference threshold.

"Difference threshold" refers to a data value indicating a cutoff value for a command-feedback difference value, above which a first status is indicated associated with the asset and below which a second status associated with the asset is indicated. In one example embodiments, a difference threshold indicates a maximum acceptable value for a command-feedback difference value before the status of the asset indicates maintenance is appropriate.

"Notification" and "maintenance notification" refers to electronically managed data outputtable via at least one computing device that indicates one or more aspects of an asset are determined to require maintenance now, or are predicted to require maintenance at a particular future timestamp.

"Range of operable values" refers to a range of data values defined between a possible minimum operational value and maximum operational value for a particular aspect of operation for an asset. An asset may be commanded, with respect to a particular operational aspect of the asset, to operate at any data value within the range of operable values.

"Sampling frequency" refers to a rate at which one or more sensor(s) are capable of capturing feedback data associated with a particular asset or plurality of assets. In some embodiments for example, a sampling frequency defines a samples-per-minute configuration for a particular sensor to feedback data.

"Threshold timing prediction model" refers to an algorithmic, statistical, and/or machine-learning model specially configured to generate a predicted time remaining until a particular data value satisfies a corresponding threshold.

"Tolerance threshold" refers to a data value indicating a maximum range that data values within a feedback data set may fluctuate while still being considered to have ceased reconfiguring towards a particular commanded data value. In some example embodiments, such as where the asset embodies a physically moving component or system, a tolerance threshold may account for small changes in the physical operation of the asset while an operational aspect of the asset is no longer meaningfully progressing towards a commanded value.

"Update ending feedback data" refers to a portion of feedback data comprising a data value and an associated timestamp, where the portion of feedback data indicates that an asset has completed updating with respect to a command event or has creased progressing towards updating with respect to a command event.

"Value updating time threshold" refers to a timestamp interval within which changes in data values for a feedback data set that do not exceed a tolerance threshold indicate that an asset is not progressing towards a commanded value. For example, in circumstances where a value updating time threshold is 2 minutes, and feedback data is captured every minute, feedback data portions having data values that do not violate a tolerance threshold for 2 consecutive minutes indicates that an asset is no longer progressing towards a commanded value.

Example Systems and Apparatuses of the Disclosure

FIG. 1 illustrates a block diagram of a system that may be specially configured within which embodiments of the present disclosure may operate. Specifically, FIG. 1 depicts an example system 100. As illustrated, the system 100 includes an optional user device 110 and a command & degradation monitoring system 102 that monitors asset(s) of a plurality of environments, specifically environments 108A, 108B, and 108C, each environment including one or more asset(s), specifically asset(s) 104A, 104B, and 104C respectively, and optionally one or more sensor(s) associated with each asset, specifically sensor(s) 106A, 106B, and 106C respectively. In some embodiments, the sensor(s) and/or the asset(s) in each environment is/are either or both communicable with the command & degradation monitoring system 102. In some embodiments, the asset(s) 104A, 104B, and/or 104C, the sensor(s) 106A, 106B, and/or 106C, the command & degradation monitoring system 102, and/or the user device 110 are communicable over one or more communications network(s), for example the communications network 112.

It should be appreciated that the communications network 112 in some embodiments is embodied in any of a myriad of network configurations. In some embodiments, the communications network 112 embodies a public network (e.g., the Internet). In some embodiments, the communications network 112 embodies a private network (e.g., an internal, localized, or closed-off network between particular devices). In some other embodiments, the communications network 112 embodies a hybrid network (e.g., a network enabling internal communications between particular connected devices and external communications with other devices). The communications network 112 in some embodiments includes one or more base station(s), relay(s), router(s), switch(es), cell tower(s), communications cable(s) and/or associated routing station(s), and/or the like. In some embodiments, the communications network 112 includes one or more user controlled computing device(s) (e.g., a user owner router and/or modem) and/or one or more external utility devices (e.g., Internet service provider communication tower(s) and/or other device(s)).

Each of the components of the system communicatively coupled to transmit data to and/or receive data from one another over the same or different wireless or wired networks embodying the communications network 112. Such configuration(s) include, without limitation, a wired or wireless Personal Area Network (PAN), Local Area Network (LAN), Metropolitan Area Network (MAN), Wide Area Network (WAN), and/or the like. Additionally, while FIG. 1 illustrate certain system entities as separate, standalone entities communicating over the communications network 112, the various embodiments are not limited to this particular architecture. In other embodiments, one or more computing entities share one or more components, hardware, and/or the like, or otherwise are embodied by a single computing device such that connection(s) between the computing entities are over the communications network 112 are altered and/or rendered unnecessary. For example, in some embodiments, an asset includes one or more sensor(s) for monitoring said asset, such that separation of the asset and sensor(s) is not required.

In some embodiments, each asset performs a particular operational function within its corresponding environment. Such an environment may embody any physical space that the asset may be located within or affect, such as a warehouse, a residence, an office, an outdoor space, and/or the like. Each asset may embody a component of a large system, such that the system is defined by a plurality of interoperable assets. In one example context where the environment 108A includes an HVAC system, for example, the asset 104A may embody a valve, pump, damper, or the like, that performs a particular function within the HVAC system. Alternatively, in one example context where the environment 108B includes an individual asset, for example, the asset(s) 104B may embody only the individual asset.

An asset performs in accordance with one or more particular values set for configurable operational aspects of the asset. For example, in some embodiments, an asset operates based at least in part on a data value set for a position setting embodying an operational aspect of an asset, a speed setting embodying an operational aspect of the asset, and/or the like. In one example context, a position setting for a valve is configurable that alters how "open" the valve is and how much of a fluid may pass via the valve (e.g., on an absolute or proportional scale). In this regard, an asset may function differently based on the data value set for such particular operational aspect(s).

The data values for such configurable operational aspects are set in any of a myriad of ways. In some embodiments, the operational aspects are set to particular values via one or more command(s) that indicate that an asset should update its operation in accordance with a new value for a particular operational aspect. In some embodiments, the command(s) are initiated via determination(s) performed by the asset itself or an associated system. Alternatively or additionally, in some embodiments, such command(s) are initiated via an external system, such as the command & degradation monitoring system 102. In some such embodiments, the external system coordinates multiple assets to operate cooperatively to perform a higher level function (e.g., set a temperature of a particular environment, operate ventilation in the environment, and/or the like).

It should be appreciated that commanded changes in operable aspects of an asset may not be reflected immediately. Instead, it may take some amount of time for the asset to physically operate, move, and/or the like in a manner that reflects the commanded change in operation, for example from a particular current operational value for an operational aspect of the asset to a newly commanded target operational value for the same operational aspect. Additionally, as an asset degrades, the time required to perform such a commanded change may increase. Further still, it will be appreciated that degradation may prevent an asset from fully reaching a commanded value. For example, in some embodiments where a position of an asset is commanded to change, degradation may physically prevent the asset from reaching such a position.

The sensor(s) associated with a particular asset may monitor data associated with one or more operational aspect(s) of an asset as the asset operates within the environment. For example, in some embodiments, the sensor(s) 106A detect the current operational value for a particular operational aspect at which the asset 104A is currently operating. Similarly, the sensor(s) 106B, detect the current operational value for a particular operational aspect at which the asset 104B is currently operating. In this regard, the sensor(s) associated with an asset may detect the current operational value for a particular operational aspect as the asset is progressing towards reaching a commanded target value for an operational aspect of the asset. In some embodiments, the sensor(s) capture feedback data that embodies the current operational value for a particular operational aspect of the asset at a current timestamp, and transmits such data to the command & degradation monitoring system 102 for processing. Additionally or alternatively, in some embodiments, the command & degradation monitoring system 102 receives feedback data from each asset itself.

The independent command & degradation monitoring system 102 includes any number of computing device(s) that perform one or more function(s) for commanding an asset to perform in accordance with particular parameters, and/or receiving data associated with such operation for purposes of outputting degradation indicator(s). In some embodiments, the command & degradation monitoring system 102 includes a first sub-system embodying a command system and a second sub-system embodying a degradation monitoring system. In some other embodiments, a separate system from the command & degradation monitoring system 102 performs the function(s) for commanding an asset to perform in accordance with particular parameters (e.g., an external command system separate from a degradation monitoring system embodying the command & degradation monitoring system 102).

The command & degradation monitoring system 102 (or a separate command system) generates and/or transmits instructions or requests embodying commands for altering the operation of the asset. In some embodiments, the command & degradation monitoring system 102 (or a separate command system) generates and transmits a command to an asset to cause the asset to begin updating an operational value towards a commanded target value represented in the command. The command & degradation monitoring system 102 (or a separate command system) may generate such command(s) based at least in part on data-driven determination(s), a predetermined procedure, and/or the like. It will be appreciated that such commands may be generated and/or transmitted to one or more asset(s) in any of a myriad of known manners.

In some embodiments, the command & degradation monitoring system 102 (or a separate degradation monitoring system) receives data and utilizes such data to generate degradation indicator(s) that indicate whether an asset has reached an unacceptable degradation level. The command & degradation monitoring system 102 (or a separate degradation monitoring system) may receive one or more types of data, including command data and/or feedback data associated with an asset for processing. For example, the command & degradation monitoring system 102 (or a separate degradation monitoring system) may actively request, or passively receive, the data via communication with the asset(s) 104A, 104B, and/or 104C, the corresponding sensor(s) 106A, 106B, and/or 106C, and/or derived directly from the command(s) transmitted to such asset(s). Additionally or alternatively, in some embodiments, the command & degradation monitoring system 102 (or a separate degradation monitoring system) generates and/or otherwise derives data insights, such as a delay value and/or a command-feedback difference value, from received portions of command data and/or portions of feedback data. Additionally or alternatively still, in some embodiments, the command & degradation monitoring system 102 (or a separate degradation monitoring system) outputs degradation indicator(s) based at least in part on the received data and/or data insights derived therefrom, such as based at least in part on the delay value and/or the command-feedback difference value.

In some embodiments, the command & degradation monitoring system 102 includes or is embodied by one or more separate sub-systems. For example, in some embodiments, the command & degradation monitoring system 102 includes a first sub-system that generates, transmits, and/or otherwise performs controlling of operational aspects of one or more asset(s). Similarly, in some such embodiments, the command & degradation monitoring system 102 includes a second sub-system that performs degradation monitoring for one or more asset(s) within one or more environment(s).

In some embodiments, the command & degradation monitoring system 102 embodies one or more cloud system(s) located remotely from one or more of the environments 108A, 108B, and/or 108C. Alternatively or additionally, in some embodiments, the command & degradation monitoring system 102 embodies one or more on-premises systems located within the environments 108A, 108B, and/or 108C. Alternatively or additionally still, in some embodiments, the command & degradation monitoring system 102 embodies a sub-system or component of an asset itself, for example one or more of the asset(s 104A, 104B, and/or 104C.

In some embodiments, the system 100 includes an additional and/or alternative building management system. In some embodiments, the building management system generates or receives commands for one or more assets, and transmits or executes the commands to facilitate an operational change of an asset. Additionally or alternatively, in some embodiments, the In some embodiments, a separate building management system is associated with each of the environments 108A, 108B, and 108C. In this regard, the building management system may receive and/or execute commands associated with only the assets within the corresponding environment. In some embodiments, a single building management system is associated with all of the environments 108A, 108B, and 108C. In some embodiments, the command & degradation monitoring system 102 retrieves certain data—for example the command data and/or feedback data associated with one or more asset(s)—via the building management system.

The user device 110 includes one or more computing device(s) accessible to an end user. In some embodiments, the user device 110 includes a personal computer, laptop, smartphone, tablet, Internet-of-Things enabled device, smart home device, virtual assistant, alarm system, and/or the like. The user device 110 may include a display, one or more visual indicator(s), one or more audio indicator(s) and/or the like that enables output to a user associated with the user device 110. For example, in some embodiments, the command & degradation monitoring system 102 transmits a notification comprising or embodying one or more degradation indicator(s) to the user device 110 for outputting.

FIG. 2 illustrates a block diagram of an example apparatus that may be specially configured in accordance with at least some example embodiments of the present disclosure; Specifically, FIG. 2 depicts an example control & degradation monitoring apparatus 200 ("apparatus 200") specially configured in accordance with at least some example embodiments of the present disclosure. In some embodiments, the command & degradation monitoring system 102 and/or a portion thereof is embodied by one or more system(s), such as the apparatus 200 as depicted and described in FIG. 2. The apparatus 200 includes processor 202, memory 204, input/output circuitry 206, communications circuitry 208, data intake circuitry 210, data derivation & prediction circuitry 212, degradation indicating circuitry 214, and optional asset commanding circuitry 216. In some embodiments, the apparatus 200 is configured, using one or more of the sets of circuitry 202, 204, 206, 208, 210, 212, 214, and/or 216, to execute and perform the operations described herein.

In general, the terms computing entity (or "entity" in reference other than to a user), device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably. In this regard, the apparatus 200 embodies a particular, specially configured computing entity transformed to enable the specific operations described herein and provide the specific advantages associated therewith, as described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), network interface(s), storage medium(s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the apparatus 200 provide or supplement the functionality of another particular set of circuitry. For example, the processor 202 in some embodiments provides processing functionality to any of the sets of circuitry, the memory 204 provides storage functionality to any of the sets of circuitry, the communications circuitry 208 provides network interface functionality to any of the sets of circuitry, and/or the like.

In some embodiments, the processor 202 (and/or co-processor or any other processing circuitry assisting or otherwise associated with the processor) is/are in communication with the memory 204 via a bus for passing information among components of the apparatus 200. In some embodiments, for example, the memory 204 is non-transitory and may include, for example, one or more volatile and/or non-volatile memories. In other words, for example, the memory 204 in some embodiments includes or embodies an electronic storage device (e.g., a computer readable storage medium). In some embodiments, the memory 204 is configured to store information, data, content, applications, instructions, or the like, for enabling the apparatus 200 to carry out various functions in accordance with example embodiments of the present disclosure.

The processor 202 may be embodied in a number of different ways. For example, in some example embodiments, the processor 202 includes one or more processing devices configured to perform independently. Additionally or alternatively, in some embodiments, the processor 202 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the apparatus 200, and/or one or more remote or "cloud" processor(s) external to the apparatus 200.

In an example embodiment, the processor 202 is configured to execute instructions stored in the memory 204 or otherwise accessible to the processor. Alternatively or additionally, the processor 202 in some embodiments is configured to execute hard-coded functionality. As such, whether configured by hardware or software methods, or by a combination thereof, the processor 202 represents an entity (e.g., physically embodied in circuitry) capable of performing operations according to an embodiment of the present disclosure while configured accordingly. Alternatively or additionally, as another example in some example embodiments, when the processor 202 is embodied as an executor of software instructions, the instructions specifically configure the processor 202 to perform the algorithms embodied in the specific operations described herein when such instructions are executed.

As one particular example embodiment, the processor 202 is configured to perform various operations associated with outputting degradation indicator(s) associated with an asset based on received data associated with operation of an asset. In some embodiments, the processor 202 includes hardware, software, firmware, and/or a combination thereof, that receives one or more portions of command data and/or one or more portions of feedback data associated with operation of a particular asset. Additionally or alternatively, in some embodiments, the processor 202 includes hardware, software, firmware, and/or a combination thereof, that determined a command-feedback difference value and/or an absolute data value. Additionally or alternatively, in some embodiments, the processor 202 includes hardware, software, firmware, and/or a combination thereof, that outputs at least one degradation indicator.

In some embodiments, the apparatus 200 includes input/output circuitry 206 that provides output to the user and, in some embodiments, to receive an indication of a user input. In some embodiments, the input/output circuitry 206 is in communication with the processor 202 to provide such functionality. The input/output circuitry 206 may comprise one or more user interface(s) and in some embodiments includes a display that comprises the interface(s) rendered as a web user interface, an application user interface, a user device, a backend system, or the like. In some embodiments, the input/output circuitry 206 also includes a keyboard, a mouse, a joystick, a touch screen, touch areas, soft keys a microphone, a speaker, or other input/output mechanisms. The processor 202 and/or input/output circuitry 206 comprising the processor may be configured to control one or more functions of one or more user interface elements through computer program instructions (e.g., software and/or firmware) stored on a memory accessible to the processor (e.g., memory 204, and/or the like). In some embodiments, the input/output circuitry 206 includes or utilizes a user-facing application to provide input/output functionality to a client device and/or other display associated with a user.

In some embodiments, the apparatus 200 includes communications circuitry 208. The communications circuitry 208 includes any means such as a device or circuitry embodied in either hardware or a combination of hardware and software that is configured to receive and/or transmit data from/to a network and/or any other device, circuitry, or module in communication with the apparatus 200. In this regard, in some embodiments the communications circuitry 208 includes, for example, a network interface for enabling communications with a wired or wireless communications network. Additionally or alternatively in some embodiments, the communications circuitry 208 includes one or more network interface card(s), antenna(s), bus(es), switch(es), router(s), modem(s), and supporting hardware, firmware, and/or software, or any other device suitable for enabling communications via one or more communications network(s). Additionally or alternatively, the communications circuitry 208 includes circuitry for interacting with the antenna(s) and/or other hardware or software to cause transmission of signals via the antenna(s) or to handle receipt of signals received via the antenna(s). In some embodiments, the communications circuitry 208 enables transmission to and/or receipt of data from user device, one or more asset(s) or accompanying sensor(s), and/or other external computing device in communication with the apparatus 200.

The data intake circuitry 210 includes hardware, software, firmware, and/or a combination thereof, that supports receiving data associated with operation of an asset, for example during a command event. For example, in some embodiments, the data intake circuitry 210 includes hardware, software, firmware, and/or a combination thereof, that captures and/or receives feedback data associated with one or more asset(s). The data intake circuitry 210 may communicate with an asset or a sensor associated therewith to receive such feedback data. Additionally or alternatively, in some embodiments, the data intake circuitry 210 includes hardware, software, firmware, and/or a combination thereof, that captures and/or receives command data associated with one or more asset(s). The data intake circuitry 210 may communicate with a command system, the asset itself, and/or identify the command data from command(s) transmitted to an asset. Additionally or alternatively, in some embodiments, the data intake circuitry 210 includes hardware, software, firmware, and/or a combination thereof, that requests data from one or more computing device(s), for example from the asset or a sensor, and receives the data in response. Additionally or alternatively, in some embodiments, the data intake circuitry 210 includes hardware, software, firmware, and/or a combination thereof, that identifies an asset type associated with a particular asset. Additionally or alternatively, in some embodiments, the data intake circuitry 210 includes hardware, software, firmware, and/or a combination thereof, that maintains one or more datastore(s) including historically received portions of data. In some embodiments, data intake circuitry 210 includes a separate processor, specially configured field programmable gate array (FPGA), or a specially programmed application specific integrated circuit (ASIC).

The data derivation & prediction circuitry 212 includes hardware, software, firmware, and/or a combination thereof, that supports various functionality associated with deriving and/or predicting data values (e.g., embodying data-driven insights) from particular received data associated with an asset. For example, in some embodiments, the data derivation & prediction circuitry 212 includes hardware, software, firmware, and/or any combination thereof, that determines a delay value based at least in part on a feedback data set and/or a command data set received associated with a particular asset. In some embodiments, the delay value comprises one or more absolute delay values, for example associated with a particular timestamp. Additionally or alternatively, in some embodiments, the data derivation & prediction circuitry 212 includes hardware, software, firmware, and/or any combination thereof, that determines a command-feedback difference value based at least in part on a command data set and/or a feedback data set received associated with a particular asset. Additionally or alternatively, in some embodiments, the data derivation & prediction circuitry 212 includes hardware, software, firmware, and/or any combination thereof, that derives a normalized delay value, for example corresponding with a particular timestamp. In some embodiments the normalized delay value is determined based at least in part on a normalization algorithm, which may be based at least in part on a command data set and/or a feedback data set. based at least in part on a command data set and/or a feedback data set. Additionally or alternatively, in some embodiments, the data derivation & prediction circuitry 212 includes hardware, software, firmware, and/or any combination thereof, that generates delay status data and/or difference status data based at least in part on delay data and/or command-feedback difference data, and at least one corresponding threshold. Additionally or alternatively, in some embodiments, the data derivation & prediction circuitry 212 includes hardware, software, firmware, and/or any combination thereof, that generates trend data associated with a plurality of delay values of a delay value set and/or a plurality of command-feedback difference values. Additionally or alternatively, in some embodiments, the data derivation & prediction circuitry 212 includes hardware, software, firmware, and/or any combination thereof, that trains, maintains, and/or uses at least one threshold timing prediction model that is trained to generate a predicted time remaining until a particular threshold is reached associated with a delay value and/or a threshold is reached associated with a command-feedback difference value for a particular asset. In some embodiments, the data derivation & prediction circuitry 212 includes a separate processor, specially configured field programmable gate array (FPGA), or a specially programmed application specific integrated circuit (ASIC).

The degradation indicating circuitry 214 includes hardware, software, firmware, and/or a combination thereof, that supports various functionality associated with generating and/or outputting degradation indicator(s). In some embodiments, the degradation indicating circuitry 214 includes hardware, software, firmware, and/or a combination thereof, that compares absolute data value(s) with a corresponding delay threshold and outputs a corresponding degradation indicator that represents whether the absolute data value(s) indicate the asset has degraded to an unacceptable level. Additionally or alternatively, in some embodiments, the degradation indicating circuitry 214 includes hardware, software, firmware, and/or a combination thereof, that compares command-feedback data value(s) with a corresponding difference threshold and outputs a corresponding degradation indicator that represents whether the command-feedback data value(s) indicate the asset has degraded to an unacceptable level. Additionally or alternatively, in some embodiments, the degradation indicating circuitry 214 includes hardware, software, firmware, and/or a combination thereof, that compares absolute data value(s) with a corresponding delay threshold and outputs a corresponding degradation indicator that represents whether the absolute data value(s) indicate the asset has degraded to an unacceptable level. Additionally or alternatively, in some embodiments, the degradation indicating circuitry 214 includes hardware, software, firmware, and/or a combination thereof, that determines whether delay trend data indicates degradation of an asset. Additionally or alternatively, in some embodiments, the degradation indicating circuitry 214 includes hardware, software, firmware, and/or a combination thereof, that determines whether difference trend data indicates degradation of an asset. Additionally or alternatively, in some embodiments, the degradation indicating circuitry 214 includes hardware, software, firmware, and/or a combination thereof, that determines a degradation indicator representing a time remaining until a difference threshold is satisfied. Additionally or alternatively, in some embodiments, the degradation indicating circuitry 214 includes hardware, software, firmware, and/or a combination thereof, that determines a degradation indicator representing a time remaining until a delay threshold is satisfied. Additionally or alternatively, in some embodiments, the degradation indicating circuitry 214 includes hardware, software, firmware, and/or a combination thereof, that determines whether a time remaining until a delay threshold is satisfied violates a threshold and outputting a degradation indicator representing the results of such a determination. Additionally or alternatively, in some embodiments, the degradation indicating circuitry 214 includes hardware, software, firmware, and/or a combination thereof, that determines whether a time remaining until a difference threshold is satisfied violates a threshold and outputting a degradation indicator representing the results of such a determination. In some embodiments, the degradation indicating circuitry 214 includes a separate processor, specially configured field programmable gate array (FPGA), or a specially programmed application specific integrated circuit (ASIC). In some embodiments, the degradation indicating circuitry 214 includes a separate processor, specially configured field programmable gate array (FPGA), or a specially programmed application specific integrated circuit (ASIC).

The optional asset commanding circuitry 216 includes hardware, software, firmware, and/or a combination thereof, that supports various functionality associated with generating and/or transmitting command(s) for controlling operational aspect(s) of at least one asset. In some embodiments, the asset commanding circuitry 216 includes hardware, software, firmware, and/or a combination thereof, that generates command that causes an asset to update one or more operational value(s) towards a commanded target value for particular operational aspect. Additionally or alternatively, in some embodiments, the asset commanding circuitry 216 includes hardware, software, firmware, and/or a combination thereof, that transmits a command to an asset. Additionally or alternatively, in some embodiments, the asset commanding circuitry 216 includes hardware, software, firmware, and/or a combination thereof, that derives command data from generated and/or transmitted command(s) associated with an asset. In some embodiments, the asset commanding circuitry 216 includes a separate processor, specially configured field programmable gate array (FPGA), or a specially programmed application specific integrated circuit (ASIC).

Additionally or alternatively, in some embodiments, two or more of the sets of circuitries 202-216 are combinable. Alternatively or additionally, in some embodiments, one or more of the sets of circuitry perform some or all of the functionality described associated with another component. For example, in some embodiments, two or more of the sets of circuitry 202-216 are combined into a single module embodied in hardware, software, firmware, and/or a combination thereof. Similarly, in some embodiments, one or more of the sets of circuitry, for example the data intake circuitry 210, the data derivation & prediction circuitry 212, the degradation indicating circuitry 214, and/or the asset commanding circuitry 216, is/are combined with the processor 202, such that the processor 202 performs one or more of the operations described above with respect to each of these sets of circuitry 210-216.

Example Data Flows and Data Architectures of the Disclosure

Having described example systems and apparatuses in accordance with embodiments of the present disclosure, example data flows and architectures of data in accordance with the present disclosure will now be discussed. In some embodiments, the systems and/or apparatuses described herein maintain data environment(s) that enable the data flows in accordance with the data architectures described herein. For example, in some embodiments, the systems and/or apparatuses described herein function in accordance with the data flow depicted in FIG. 3, and the data flows and data architectures depicted and/or described with respect to FIGS. 4-8 are performed or maintained via the command & degradation monitoring system 102 embodied by an apparatus 200.

FIG. 3 illustrates an example data flow in accordance with at least some example embodiments of the present disclosure. Specifically, FIG. 3 depicts a flow of data between the various computing devices depicted and described in FIG. 1.

As illustrated, the data flow optionally includes transmission of a command 304 from a command system 302 to an asset 306. The command 304 triggers the asset 306 to progressively updating one or more operational value(s) for corresponding operational aspect(s) of the asset. The command 304, once received by the asset 306, causes the asset 306 to begin updating such an operational value. In some embodiments, the command system 302 is embodied by or a sub-system of the degradation monitoring system 350.

In some embodiments, the command 304 is transmitted to the asset 306 for execution indirectly, for example via a building management system. In some embodiments, the command system 302 transmits the command 304 to the building management system, which stores data associated with the command (e.g., command data indicating the commanded data and/or a timestamp associated with the command), and/or forwards or otherwise communicates the command 304 to the asset 306 for execution. Additionally or alternatively, in some embodiments, the building management system maintains (e.g., retrieves and/or stores) feedback data representing the results of the command 304, for example embodied by the feedback data 310 as described further herein. The feedback data may similarly be transmitted from the building management system to the degradation monitoring system 350, for example, and/or other system(s) for processing. In other embodiments, the command system 302 directly transmits the command 304 to the asset 306.

In some embodiments, the optional command system 302 transmits command data 312 to the degradation monitoring system 350. In some embodiments, the command data 312 indicates commanded operational values and corresponding timestamps for an asset based at least in part on transmitted commands, for example the command 304. The command system 302 may derive such command data 312 based at least in part on the command 304 and transmit such data to the degradation monitoring system 350. Alternatively or additionally, in some embodiments, the degradation monitoring system 350 receives the command 304 and receives command data by deriving the command data based at least in part on the command 304, such as by modeling the commanded operational values and corresponding timestamps based on the command 304, and/or optionally current feedback data indicating a current operational value for the asset. Alternatively or additionally still, in some embodiments, the degradation monitoring system 350 identifies the command 304 via communication with the asset 306, and/or derives the command data 312 based at least in part on communication with the asset 306. Alternatively or additionally, in some embodiments, the degradation monitoring system 350 picks up the command data as it is communicated to the asset 306 via a communication system.

The asset 306 proceeds to operate in accordance with the received command 304. For example, the asset 306 may progress with updating an operational value associated with a particular operational aspect to a new, commanded target value in the command 304. In this regard, as the asset 306 continues to perform after receiving the command 304, the current operational value for the corresponding operational aspect continues to change towards a commanded target value until the command target value is reached or until the asset 306 cannot sufficiently proceed towards the commanded target value (e.g., due to degradation).

As the asset 306 operates, feedback data 310 is captured and/or received via the degradation monitoring system 350. The feedback data 310 may indicate a current operational value for a particular operational aspect of the asset 306 at a particular timestamp. In some embodiments, the sensor(s) 308 monitor operation of the asset 306 to capture the feedback data 310. Alternatively or additionally, in some embodiments, the asset 306 captures the feedback data 310 itself. In some embodiments, the degradation monitoring system 350 requests the feedback data 310 from the asset 306 and/or the sensor(s) 308, and receives the feedback data 310 in response. Alternatively or additionally, in some embodiments, the degradation monitoring system 350 receives the feedback data 310 automatically from the sensor(s) 308 and/or asset 306.

The degradation monitoring system 350 may process the received data, including the feedback data 310 and/or the command data 312, to generate and/or derive one or more portions of data and/or data-driven insights as described herein. For example, in some embodiments, the degradation monitoring system 350 processes the feedback data 310 and/or command data 312 to determine a command-feedback difference value and/or a delay value, and/or determinations derived therefrom. Additionally or alternatively, the degradation monitoring system 350 may generate any number of degradation indicator(s)/notification(s) 314 that indicate whether such data and/or data insights indicate degraded operation of the asset 306. In some embodiments, the notification(s) include visual, data, and/or audio notifications for outputting to a user, such as the user device 110.

In some embodiments, the degradation monitoring system 350 outputs the degradation indicator(s)/notification(s) 314 to a user device 110 associated with the asset 306. In this regard, the degradation monitoring system 350 may include data that associates an asset, such as the asset 306, with corresponding user device(s), such as the user device 110. Alternatively or additionally, in some embodiments, the user device 110 represents a user device associated with an administrator of the asset 306 and/or a maintainer responsible for performing maintenance on the asset 306. In this regard, the degradation monitoring system 350 may transmit notification(s) of the degradation indicator(s) generated to the user device 110 to cause outputting of such notification(s) via the user device 110.

In some embodiments, the command data 312 is communicated to the degradation monitoring system 350 indirectly. For example, in some embodiments, the command data 312 is communicated via a building monitoring system that receives the command 304, and/or facilitates execution of the command 304 with the asset 306.

FIG. 4 illustrates an example data architecture in accordance with at least some example embodiments of the present disclosure. Specifically, FIG. 4 illustrates a data architecture for a portion of feedback data and a portion of command data in accordance with at least some embodiments of the present disclosure. In this regard, any feedback data and/or command data received, transmitted, generated, and/or otherwise manipulated via the systems described herein may be architected in accordance with the depicted data architecture to include the particular data values therein.

As illustrated, the feedback data 402 includes an actual data value 404 and a timestamp 406. In some embodiments, the actual data value 404 represents an operational value captured and/or otherwise measured for a particular asset. In some embodiments, this data value 404 represents a speed of an asset, a position of an asset, and/or the like, representing an actual configuration of the physical operation of the asset. It will be appreciated that the actual data value 404 may be updated as the asset updates its operation to progress an operational value towards a commanded target value for a particular operational aspect.

The feedback data 402 further includes a timestamp 406. The timestamp 406 may be associated with the actual data value 404. In this regard, the timestamp 406 indicates that the actual data value 404 was the current operational value of the operational aspect for the asset at the time indicated by the timestamp 406. In this regard, the feedback data 402 may represent the actual operational value for an operational aspect of the asset at the particular time indicated by the timestamp 406.

It should be appreciated that a plurality of portions of feedback data may be captured and/or stored, for example as a feedback data set. The feedback data set may define a timeseries of the data values for a particular operational aspect of the asset. In some embodiments, the feedback data set represents a timeseries of operational values for a particular operational aspect as the asset updates the current operational value towards a commanded target value.

In some embodiments, the feedback data 402 is captured at a particular rate. For example, in some embodiments feedback data 402 is captured at a sampling rate defined by one or more controller(s), sensor(s), and/or the like. In this regard, the feedback data 402 may include a timestamp representing the current time at which a particular value represented by the actual data value 404 is captured.

In some embodiments, the command data 408 represents a commanded operational data value for an operational aspect of an asset as the asset updates from a starting operational value to a commanded target value associated with a particular command. As illustrated, the command data 408 similarly includes an commanded data value 410 and an timestamp 412. The commanded data value 410 may represent a predicted or modeled data value that an operational value for a particular operational aspect should be at the time represented by the timestamp 412. In some embodiments, the commanded data value 410 and corresponding timestamp 412 are calculated and/or modeled in accordance with a non-degraded state of the asset, for example such that the resulting commanded data value 410 is reached at timestamp 412 when an asset is progressing from a starting operational value to a commanded target value in a circumstance where the asset is not degraded or minimally degraded.

In some embodiments, the command data 408 is captured at a particular rate. For example, in some embodiments command data 408 is captured at a sampling rate defined by one or more controller(s), sensor(s), and/or the like. In this regard, the command data 408 may include a timestamp representing the current time at which a particular value represented by the commanded data value 410 transmitted for execution associated with a corresponding asset.

It will be appreciated that in some embodiments, the difference between the commanded data value 410 and the actual data value 404 for a particular time represented by the timestamp and 406 and timestamp 412 may grow as degradation of the asset increases. For example, as an asset physically degrades, the time for the asset to reach a particular commanded target value may increase due to the impact of such degradation.

FIG. 5 illustrates an example graphical representation of received a command data set and a feedback data set in accordance with at least some example embodiments of the present disclosure. Specifically, FIG. 5 depicts an example graphical representation 500 including a plot of a command data set and a feedback data set for a particular asset, as well as graphical representations of data insights derivable therefrom. It will be appreciated that the command data set and/or the feedback data set may each include any number of data objects, each architected as depicted and described in FIG. 4. In this regard, each portion of data may be plotted based at least in part on the data value and timestamp, or commanded data value and corresponding timestamp, to form the depicted graphical representations.

As illustrated for example, the graphical representation 500 includes a feedback data set plot 506 and a command data set plot 508. The feedback data set plot 506 graphically represents a plurality of portions of feedback data plotted with, for each portion of feedback data, the data value indicating a y-axis position and the timestamp representing an x-axis position along the graphical representation 500. Similarly, the command data set plot 508 graphically represents a plurality of portions of command data plotted with, for each portion of command data, the commanded data value indicating a y-axis position and the corresponding timestamp representing an x-axis position along the graphical representation 500. In this regard, it will be appreciated that points on each of the feedback data set plot 506 and the command data set plot 508 that are aligned vertically are associated with timestamps indicating the same time, and points that are aligned horizontally are associated with the same value in commanded data value/feedback data value.

The graphical representation 500 may be associated with a particular command. For example, the command in one example context indicates that an asset should update a particular operational value for an operational aspect to reach a new value of 0 (e.g., 0% of a maximum possible value as illustrated). As illustrated, the command data set plot 508 indicates that the operational value was commanded (and thereby expected) to drop from a first value of 55% to a second value of 0% upon initiation of the command. The 55% operational value may indicate a previously commanded target value for the operational value, for example set via a previously initiated command. The feedback data set plot 506, however, remains offset from the command data set plot 508, indicating that the asset is suffering from at least some degradation that prevents the asset from reaching the commanded target value.

The command associated with the command data set plot 508 may be associated with a particular timestamp at which the command is transmitted and/or to be initiated by the asset. For example, as illustrated, the command data set plot 508 includes a first portion of command data 512A associated with a timestamp of 11:20 at which the asset is commanded to begin to perform the command. The command data set plot 508 further includes a second portion of command data 512B associated with a timestamp of 11:21, at which the asset is commanded to end performance of the command (e.g., by reaching the commanded target value). In this regard, the command data set represented by the command data set plot 508 indicates that the command is expected to be completed by the asset in 1 minute starting from the commanded data value of 55% of max and ending at a commanded data value of 0%.

In some embodiments, an asset receives a command from a control system, for example embodying a controller associated with the particular asset or multiple assets. In this regard, the controller may generate and transmit a control to the asset to alter one or more operational aspects of the asset. In some embodiments, the controller utilizes current data value(s) for one or more measured and/or determinable data properties (e.g., a current temperature, for example) to determine whether to invoke a command and/or what command to invoke.

The feedback data set plot 506 indicates that the asset fails to perform the command perfectly as commanded. For example, the feedback data set plot 506 includes a first portion of feedback data 510A associated with a timestamp of 11:20 at which the asset actually begins to perform the command. The asset fails to reach the commanded target value within 1 minute, however, as the feedback data set plot 506 includes a second portion of feedback data 510B at timestamp 11:21 associated with an actual data value of approximately 42%, and that subsequently continues dropping. The feedback data set plot 506 includes a third portion of feedback data 510C at timestamp 11:22 associated with an actual data value of approximately 25%. As depicted, the feedback data set plot 506 levels out to a consistent data value after timestamp 11:22, indicating that the asset cannot sufficiently further progress towards the commanded target value (e.g., due to degradation).

In some embodiments, the apparatus 200 utilizes the feedback data set represented by the feedback data set plot 506 and/or command data set represented by command data set plot 508 to derive one or more data insights therefrom. For example, in some embodiments, the apparatus 200 determines the first portion of command data 512A as update starting command data indicating the data value and timestamp at which the asset is commanded to begin initiating a command. The apparatus 200 may determine that the first portion of command data 512A represents such update starting command data based on the portions of command data previous to and subsequent to the first portion of command data 512A, for example where the data portion for an immediately prior timestamp is at the same commanded data value and where the data portion for an immediately subsequent timestamp is at a different commanded data value.

Additionally or alternatively, in some embodiments, the apparatus 200 may determine that second portion of command data 512B represents an update ending command data indicating the data value and timestamp at which the asset is commanded to complete the command. The apparatus 200 may determine that the second portion of command data 512B represents such update ending command data based on portions of the command data previous to and subsequent to the second portion of command data 512A. For example, the apparatus 200 may determine the second portion of command data 512B represents the update ending command data where the data portion for an immediately prior timestamp is at a changing data value and where the data portion for an immediately subsequent timestamp is at the same commanded data value.

In some embodiments, the apparatus 200 may similarly process data to determine portions of feedback data that correspond to a start of initiating a command and/or end of initiating a command. For example, in some embodiments, the apparatus 200 determines the first portion of feedback data 510A as update starting feedback data indicating the data value and timestamp at which the asset actually began initiating a command. The apparatus 200 may determine that the first portion of feedback data 510A represents such update starting feedback data based on the portions of control previous to and subsequent to the first portion of feedback data 510A, for example where the data portion for an immediately prior timestamp is at (or approximately) the same data level and where the data portion for an immediately subsequent timestamp is at a different data value.

Additionally or alternatively, in some embodiments, the apparatus 200 may determine that the third portion of feedback data 310C represents update ending feedback data, indicating the data value and timestamp at which the asset is determined to have completed, or ceased sufficient progression towards completing, an initiated command. The apparatus 200 may determine that the third portion of feedback data 510C represents such update ending feedback data based on portions of the feedback data previous to and subsequent to the third portion of feedback data 510C. For example, the apparatus 200 may determine the third portion of feedback data 510C represents the update ending feedback data where the data portion for an immediately prior timestamp (e.g., the second feedback data portion 510B) is at a different data value and where the data portion for an immediately subsequent timestamp is at the same data value.

The graphical representation 500 further depicts a derived data insight representing a delay value, specifically delay value 502. The delay value represents a time interval between a difference in the timestamp at which the command was commanded to be complete, and the timestamp at which the command was determined to actually complete. In some embodiments, the apparatus 200 determines the delay value 502 based at least in part on determined update ending command data and update ending feedback data. For example, in some embodiments, the apparatus 200 determines the delay value 502 by determining a difference in a first timestamp of the update ending command data and a second timestamp of the update ending feedback data, as depicted. In some embodiments, the delay value 502 represents an absolute delay value determined between the associated timestamps. Alternatively or additionally, in some embodiments the delay value 502 represents a normalized delay determined from the actual difference between the associated timestamps.

Additionally, the graphical representation 500 further depicts a derived data insight representing a command-feedback difference value, specifically command-feedback difference value 504. The command-feedback value represents a difference in data value between a command data portion(s) and feedback data portion(s) after the later of a first timestamp of update ending feedback data and/or a second timestamp of update ending command data. In some embodiments, the apparatus 200 determines the command-feedback difference value 504 by determining a difference in a first data value of the update ending command data and a second data value of the update ending feedback data.

It will be appreciated that in some contexts, an asset may not operate in accordance perfectly with a particular operational data value for a particular operational aspect. Due to environmental influences, degradation, and/or the like, the operational data value may in fact slightly fluctuate over time. In this regard, in some embodiments the apparatus 200 determines update ending feedback data even if subsequent data points are associated with slightly different values. For example, in some embodiments, the apparatus 200 determines that, after a particular timestamp, data values from a feedback data set remain within a tolerance threshold for a timestamp interval that satisfies a value updating time threshold. In this regard, the apparatus 200 may assign the data object associated with the particular timestamp, where the particular timestamp is the earliest time where such conditions remain true, as the update ending feedback data.

FIG. 6 illustrates an example data flow for outputting degradation indicator(s) based on a delay value and/or a command-feedback difference value in accordance with at least some example embodiments of the present disclosure. Specifically, FIG. 6 depicts outputting of degradation indicator(s) based at least in part on a command-feedback difference value 504 and delay value 502, each derived from feedback data 402 and command data 408, as depicted and described herein. In some embodiments, the apparatus 200 performs the data flow as depicted and described with respect to FIG. 6 to generate and/or output the degradation indicator(s).

In some embodiments, the apparatus 200 utilizes the command-feedback difference value 504 to generate difference status data, for example difference status data 606. In some embodiments, the apparatus 200 generates the difference status data 606 based at least in part on a comparison between the command-feedback difference value 504 and a difference threshold 604. The difference threshold 604 may indicate a value that, when the command-feedback difference value 504 exceeds or otherwise satisfies the value, indicates that the asset corresponding to the command-feedback difference value 504 has degraded to an unacceptable level. The difference threshold 604 may be predetermined, set by a user, set based at least in part on an asset type associated with the asset, set by a manufacturer associated with the asset, and/or the like.

In some embodiments, the difference threshold 604 is determinable based at least in part on one or more characteristics of the asset corresponding to the feedback data 402 and/or command data 408, one or more characteristics of the command associated with the command data 408, and/or the like. For example, in some embodiments, the difference threshold 604 is determinable based at least in part on an asset type for the asset corresponding to the feedback data 402 and the command data 408. In this regard, different asset types (e.g., dampers versus fans versus valves, and the like) may each be associated with different values representing a corresponding difference thresholds. Additionally or alternatively, in some embodiments, the difference threshold 604 is determinable based at least in part on a type of command corresponding to the command data 408. For example, in some embodiments, a command for opening an asset of a first type (e.g., a valve) is associated with a first difference threshold, whereas a command for closing the asset of the first type is associated with a second difference threshold. It will be appreciated that in some embodiments, different threshold values may be associated with different combinations of data parameters (e.g., a combination of asset type and command type, for example). In some embodiments, the difference threshold 604 embodies a first threshold corresponding to absolute difference values and a second threshold corresponding to normalized difference values.

In some embodiments, the apparatus 200 generates the difference status data 606 indicating the results of the comparison. For example, in some embodiments, the apparatus 200 generates the difference status data 606 embodying a first data value indicating the asset is affected by an unacceptable level of degradation in a circumstance where the command-feedback difference value 504 satisfies the difference threshold 604, and/or embodying a second data value indicating the asset is not affected by an unacceptable level of degradation in a circumstance where the command-feedback difference value 504 does not satisfy the difference threshold 604.

Additionally or alternatively, in some embodiments, the apparatus 200 outputs a degradation indicator based on the difference status data 606. For example, as indicated at decision 608, in some embodiments the apparatus 200 outputs a degradation indicator 612 representing a degraded status in a circumstance where the difference status data 606 is determined to indicate degradation of the asset past an unacceptable level. Similarly, as indicated at decision 608, in some embodiments the apparatus 200 outputs a degradation indicator 610 representing an okay—or otherwise "non-degraded" status—in a circumstance where the difference status data 606 is determined to not indicate degradation of the asset past an unacceptable level. Alternatively or additionally, in some embodiments the apparatus 200 does not generate any degradation indicator in a circumstance where sufficient degradation is not indicated by the difference status data 606. In some embodiments, the apparatus 200 outputs the generated degradation indicator(s) as notification(s) to a user device, display, and/or the like.

In some embodiments, the apparatus 200 utilizes the delay value 502 to generate delay status data, for example delay status data 616. In some embodiments, the apparatus 200 generates the delay status data 616 based at least in part on a comparison between the delay value 502 and a delay threshold 614. The delay threshold 614 may indicate a value that, when the delay value 502 exceeds or otherwise satisfies the value, indicates that the asset corresponding to the delay value 502 has degraded to an unacceptable level. The delay threshold 614 may be predetermined, set by a user, set based at least in part on an asset type associated with the asset, set by a manufacturer associated with the asset, and/or the like.

In some embodiments, the delay threshold 614 is determinable based at least in part on one or more characteristics of the asset corresponding to the feedback data 402 and/or command data 408, one or more characteristics of the command associated with the command data 408, and/or the like. For example, in some embodiments, the delay threshold 614 is determinable based at least in part on an asset type for the asset corresponding to the feedback data 402 and the command data 408. In this regard, different asset types (e.g., dampers versus fans versus valves, and the like) may each be associated with different values representing a corresponding delay threshold. Additionally or alternatively, in some embodiments, the delay threshold 614 is determinable based at least in part on a type of command corresponding to the command data 408. For example, in some embodiments, a command for opening an asset of a first type (e.g., a valve) is associated with a first delay threshold, whereas a command for closing the asset of the first type is associated with a second delay threshold. It will be appreciated that in some embodiments, delay threshold values may be associated with different combinations of data parameters (e.g., a combination of asset type and command type, for example). In some embodiments, the delay threshold 614 embodies a first threshold corresponding to absolute delay values and a second threshold corresponding to normalized delay values.

In some embodiments, the apparatus 200 generates the delay status data 616 indicating the results of the comparison. For example, in some embodiments, the apparatus 200 generates the delay status data 616 embodying a first data value indicating the asset is affected by an unacceptable level of degradation in a circumstance where the delay value 502 satisfies the delay threshold 614, and/or embodying a second data value indicating the asset is not affected by an unacceptable level of degradation in a circumstance where the delay value 502 does not satisfy the delay threshold 614.

Additionally or alternatively, in some embodiments, the apparatus 200 outputs a degradation indicator based on the delay status data 616. For example, as indicated at decision 618, in some embodiments the apparatus 200 outputs a degradation indicator 622 representing a degraded status in a circumstance where the delay status data 616 is determined to indicate degradation of the asset past an unacceptable level. Similarly, as indicated at decision 618, in some embodiments the apparatus 200 outputs a degradation indicator 620 representing an okay—or otherwise "non-degraded" status—in a circumstance where the delay status data 616 is determined to not indicate degradation of the asset past an unacceptable level. Alternatively or additionally, in some embodiments the apparatus 200 does not generate any degradation indicator in a circumstance where sufficient degradation is not indicated by the delay status data 616. In some embodiments, the apparatus 200 outputs the generated degradation indicator(s) as notification(s) to a user device, display, and/or the like.

FIG. 7 illustrates an example graphical representation of trend data and predicted time remaining until a corresponding threshold in accordance with at least some example embodiments of the present disclosure. Specifically, FIG. 7 depicts an example graphical representation 700 including a plot of particular data objects including derived data values and corresponding timestamps, such as a delay value set, normalized delay value set, and/or command-feedback difference value set together with corresponding timestamps corresponding to each data value, and trend data associated with such data values and corresponding timestamps, and a corresponding threshold for such data values. It will be appreciated that the plotted data set may include any number of data object(s) and/or value(s), for example any number of delay values, normalized delay values, or command-feedback difference values. In this regard, each portion of data may be plotted based at least in part on the data value and corresponding timestamp to form the depicted graphical representation 700. For ease of understanding and brevity of disclosure, FIG. 7 is further described specifically with respect to delay values, however it will be appreciated that the graphical representation similarly may be utilized to depict and/or process normalized delay values and/or command-feedback difference values.

As illustrated for example, the graphical representation 700 depicts a data object set including a delay value set and corresponding timestamp set. Specifically, graphical representation 700 includes a plurality of data points 702A, 702B, 702C, 702D, 702E, 702F, 702G, 702H, and 702I that each correspond to a data object of a data object set including a delay value set and corresponding timestamp set. In this regard, each data point of the data points 702A-702I is associated with a particular delay value and corresponding timestamp at which the delay value was generated and/or otherwise determined. For each data point, for example, the delay value corresponding to said data point indicates a y-axis position and the timestamp corresponding to said data point indicates an x-axis position along the graphical representation 700.

The data objects corresponding to the plurality of data points 702A-702I similarly may be used to generate trend data associated with such delay data values and corresponding timestamps across time. For example, in some embodiments, the apparatus 200 processes the data objects corresponding to the plurality of data points 702A-702I to generate delay trend data represented by the trendline 706. In some embodiments, the delay trend data represented by the trendline 706 indicates a determined relationship between the data objects corresponding to the data points 702A-702I. In some embodiments, the delay trend data is determined based at least in part on one or more regression model(s), machine-learning model(s), algorithmic model(s), and/or statistical model(s), that are specially configured to determine the delay trend data from the absolute difference values and timestamps corresponding to the plurality of data points 702A-702I. It should be appreciated that the trendline 706 may extend into future timestamps for which corresponding delay value(s) have not yet been determined.

The graphical representation 700 further depicts a threshold line 704. In some embodiments, the threshold line 704 is depicted at a particular value corresponding to a particular data value representing a delay threshold. The delay threshold, as described herein, may embody a value that, in a circumstance where a delay threshold exceeds or otherwise said value, indicate that the asset is degraded past an acceptable level. In this regard, it will be appreciated that the threshold line 704 is depicted as a horizontal line at a particular determined value.

In some embodiments, at least a portion of the delay trend data is compared relative to delay trend data for one or more other assets. For example, in some embodiments, the delay trend data is compared against other delay trend data for other assets of the same asset type to determine whether the delay trend data indicates degradation. In some embodiments, such relative determinations may be indicated in a circumstance where a threshold is defined based on an average value, a highest value, a median value, or another calculable data value derived from the set of delay trend data corresponding to each considered asset. In some embodiments, for example, delay trend data representing a slope higher than a particular distance from the average slope, or a particular threshold above the next highest slope, may be utilized to determine whether such data indicates degradation.

In some embodiments, the apparatus 200 generates a predicted time until the delay threshold represented by the threshold line 704 is satisfied. The apparatus 200 may determine the predicted time until the delay threshold is satisfied based at least in part on the delay trend data corresponding to the trendline 706. In some such embodiments, the predicted time until the delay threshold corresponds to the timestamp at which the delay trend data indicates that a future delay threshold value will meet and/or exceed (or otherwise satisfy) the delay threshold. As depicted, the graphical representation 700 depicts a data point at a timestamp 708, with the timestamp 708 representing the time at which the delay value for the asset will exceed the threshold represented by the threshold line 704. In some embodiments, the apparatus 200 determines the predicted time until the delay threshold is satisfied based on a difference between a current timestamp and the timestamp represented at timestamp 708.

FIG. 8A illustrates an example data flow for outputting degradation indicator(s) based on delay trend data in accordance with at least some example embodiments of the present disclosure. Specifically FIG. 8A depicts a data flow for outputting degradation indicator(s) based at least in part on delay trend data 804 derived from a delay value set 802, as depicted and described herein. The delay value set 802 may include an absolute delay value set, or in some embodiments include a normalized delay value set. In some embodiments, the apparatus 200 performs the data flow as depicted and described with respect to FIB. 8A to generate and/or output the degradation indicator(s).

In some embodiments, the apparatus 200 utilizes the delay value set 802 to generate the delay trend data, for example the delay trend data 804. In some embodiments, the apparatus 200 generates the delay trend data 804 as described in FIG. 7. In this regard, the delay trend data 804 may represent a relationship of the delay values in the delay value set 802 and be utilized to predict future delay values for subsequent timestamps. For example, in some embodiments, the apparatus 200 generates delay trend data 804 that embodies a formula, slope or other trendline relationship based on the delay value set 802. In some embodiments, the slope or other relationship is comparable to another slope or another relationship for another asset for use in determining whether degradation is present relative to other assets.

Optionally in some embodiments, the apparatus 200 outputs a degradation indicator based on the delay trend data 804. For example, as indicated at optional decision 812, in some embodiments the apparatus 200 outputs a degradation indicator 816 representing a degraded status in a circumstance where the delay trend data 804 is determined to indicate degradation of the asset past an unacceptable level. Similarly, as indicated at optional decision 812, in some embodiments the apparatus 200 outputs a degradation indicator 814 representing an okay—or otherwise "non-degraded" status—in a circumstance where the delay trend data is determined not to indicate degradation of the asset past an unacceptable level. Alternatively or additionally, in some embodiments, the apparatus 200 does not generate any degradation indicator in circumstances where the delay trend data 804 does not indicate degradation past an unacceptable level. In some embodiments, the apparatus 200 outputs the generated degradation indicator(s) as notification(s) to a user device, display, and/or the like.

In some embodiments, the apparatus 200 determines whether the delay trend data 804 indicates degradation at optional decision 812 based at least in part on a threshold corresponding to the delay trend data 804. For example, in some embodiments, the apparatus 200 compares the delay trend data 804 with a maximum slope value embodied by the threshold corresponding to the delay trend data. In this regard, the apparatus 200 may determine that the delay trend data 804 indicates degradation of the asset past an acceptable level in a circumstance where the delay trend data 804 embodies a slope value exceeding a threshold slope value defined by the threshold.

Additionally or alternatively, as depicted in FIG. 8A, in some embodiments the apparatus 200 applies the delay trend data 804 to a threshold timing prediction model 806. The threshold timing prediction model 806 in some embodiments includes one or more specially trained algorithmic, machine-learning, and/or statistical model(s) that determines a timestamp until a delay value threshold is satisfied 808 ("timestamp 808"). In this regard, the threshold timing prediction model 806 may be specially trained, based on historical delay trend data, to generate and/or otherwise determine the timestamp 808 from an inputted delay trend data such as the delay trend data 804. The apparatus 200 may generate the timestamp 808 based on a difference between the current timestamp and a timestamp generated by the threshold timing prediction model 806. Additionally or alternatively, in some embodiments, the threshold timing prediction model 806 outputs the time remaining until a delay value threshold is satisfied 808 automatically without any such post-processing.

Optionally, in some embodiments, the apparatus 200 outputs a degradation indicator 830 that represents the time remaining until the delay value threshold is satisfied. In this regard, the degradation indicator 830 may indicate that the asset will reach an unacceptable level of degradation in the particular time.

Additionally or alternatively, in some embodiments, the apparatus 200 outputs a degradation indicator based on the time remaining until the delay value threshold is satisfied 808 is less than—or otherwise satisfies—a minimum time threshold associated with the delay value. For example, as indicated at optional decision 818, in some embodiments the apparatus 200 outputs a degradation indicator 822 representing a degraded status in a circumstance where the time remaining until the delay value threshold is satisfied 808 is determined to fall below the minimum time threshold—thus indicating an unacceptable level of degradation is affecting the asset. Similarly, as indicated at decision 818, in some embodiments the apparatus 200 outputs a degradation indicator 820 representing an okay—or otherwise "non-degraded" status—in a circumstance where the time remaining until the delay value threshold is satisfied 808 does not fall below the minimum time threshold corresponding to delay value. In some embodiments, the apparatus 200 does not generate any degradation indicator in a circumstance where the time remaining until the delay value threshold is satisfied 808 does not fall below the minimum time threshold corresponding to delay value. In some embodiments, the apparatus 200 outputs the generated degradation indicator(s) as notification(s) to a user device, display, and/or the like.

FIG. 8B illustrates an example data flow for outputting degradation indicator(s) based on difference trend data in accordance with at least some example embodiments of the present disclosure. Specifically, FIG. 8B depicts a data flow for outputting degradation indicator(s) based at least in part on difference trend data 854 derived from a command-feedback difference value set 852, as depicted and described herein. In some embodiments, the apparatus 200 performs the data flow as depicted and described with respect to FIG. 8B to generate and/or output the degradation indicator(s).

In some embodiments, the apparatus 200 utilizes the command-feedback difference value set 852 to generate the difference trend data, for example the difference trend data 854. In some embodiments, the apparatus 200 generates the difference trend data 854 in a similar manner to that described with respect to the delay trend in FIGS. 7 and 8A. In this regard, the difference trend data 854 may represent a relationship of the command-feedback difference values in the command-feedback difference value set 852 and be utilized to predict future command-feedback difference values for subsequent timestamps. For example, in some embodiments, the apparatus 200 generates difference trend data 854 that embodies a formula, slope or other trendline relationship based on the command-feedback difference value set 852.

Optionally in some embodiments, the apparatus 200 outputs a degradation indicator based on the difference trend data 854. For example, as indicated at optional decision 862, in some embodiments the apparatus 200 outputs a degradation indicator 866 representing a degraded status in a circumstance where the difference trend data 854 is determined to indicate degradation of the asset past an unacceptable level. Similarly, as indicated at optional decision 862, in some embodiments the apparatus 200 outputs a degradation indicator 864 representing an okay—or otherwise "non-degraded" status—in a circumstance where the difference trend data 854 is determined not to indicate degradation of the asset past an unacceptable level. Alternatively or additionally, in some embodiments, the apparatus 200 does not generate any degradation indicator in circumstances where the difference trend data 854 does not indicate degradation past an unacceptable level. In some embodiments, the apparatus 200 outputs the generated degradation indicator(s) as notification(s) to a user device, display, and/or the like.

In some embodiments, the apparatus 200 determines whether the difference trend data 854 indicates degradation at optional decision 862 based at least in part on a threshold corresponding to the difference trend data 854. For example, in some embodiments, the apparatus 200 compares the difference trend data 854 with a maximum slope value embodied by the threshold corresponding to the difference trend data. In this regard, the apparatus 200 may determine that the difference trend data 854 indicates degradation of the asset past an acceptable level in a circumstance where the difference trend data 854 embodies a slope value exceeding a threshold slope value defined by the threshold.

Additionally or alternatively, as depicted in FIG. 8B, in some embodiments the apparatus 200 applies the difference trend data 854 to a threshold timing prediction model 856. The threshold timing prediction model 856 in some embodiments includes one or more specially trained algorithmic, machine-learning, and/or statistical model(s) that determines a timestamp until a difference threshold is satisfied 858 ("timestamp 858"). In this regard, the threshold timing prediction model 856 may be specially trained, based on historical difference trend data, to generate and/or otherwise determine the timestamp 858 from an inputted difference trend data such as the difference trend data 854. The apparatus 200 may generate the timestamp 858 based on a difference between the current timestamp and a timestamp generated by the threshold timing prediction model 856. Additionally or alternatively, in some embodiments, the threshold timing prediction model 856 outputs the time remaining until a difference threshold is satisfied 858 automatically without any such post-processing.

Optionally, in some embodiments, the apparatus 200 outputs a degradation indicator 860 that represents the time remaining until the difference threshold is satisfied. In this regard, the degradation indicator 860 may indicate that the asset will reach an unacceptable level of degradation in the particular time.

Additionally or alternatively, in some embodiments, the apparatus 200 outputs a degradation indicator based on the time remaining until the difference threshold is satisfied 858 is less than—or otherwise satisfies—a minimum time threshold associated with the command-feedback difference value. For example, as indicated at optional decision 868, in some embodiments the apparatus 200 outputs a degradation indicator 872 representing a degraded status in a circumstance where the time remaining until the difference threshold is satisfied 858 is determined to fall below the minimum time threshold—thus indicating an unacceptable level of degradation is affecting the asset. Similarly, as indicated at decision 868, in some embodiments the apparatus 200 outputs a degradation indicator 870 representing an okay— or otherwise "non-degraded" status—in a circumstance where the time remaining until the difference threshold is satisfied 858 does not fall below the minimum time threshold corresponding to command-feedback difference value. In some embodiments, the apparatus 200 does not generate any degradation indicator in a circumstance where the time remaining until the difference threshold is satisfied 858 does not fall below the minimum time threshold corresponding to command-feedback difference value. In some embodiments, the apparatus 200 outputs the generated degradation indicator(s) as notification(s) to a user device, display, and/or the like.

Example Processes of the Disclosure

Having described example systems and apparatuses, data architectures, data flows, and graphical representations in accordance with the disclosure, example processes of the disclosure will now be discussed. It will be appreciated that each of the flowcharts depicts an example computer-implemented process that is performable by one or more of the apparatuses, systems, devices, and/or computer program products described herein, for example utilizing one or more of the specially configured components thereof.

The blocks indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally or alternatively, any of the processes in various embodiments include some or all operational steps described and/or depicted, including one or more optional blocks in some embodiments. With regard to the flowcharts illustrated herein, one or more of the depicted block(s) in some embodiments is/are optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

FIG. 9 illustrates a flowchart depicting operations of an example process for outputting at least one degradation indicator in accordance with at least some example embodiments of the present disclosure. Specifically, FIG. 9 depicts operations of an example process 900. In some embodiments, the process 900 is embodied by computer program code stored on a non-transitory computer-readable storage medium of a computer program product configured for execution to perform the process as depicted and described. Alternatively or additionally, in some embodiments, the process 900 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with at least one apparatus, at least one sensor associated with the at least one apparatus, at least one end-user computing device, and/or in some embodiments an optional external control system. For purposes of simplifying the description, the process 900 is described as performed by and from the perspective of the apparatus 200.

The process 900 begins at operation 902. At operation 902, the apparatus 200 includes means such as the data intake circuitry 210, the data derivation & prediction circuitry 212, the degradation indicating circuitry 214, the asset commanding circuitry 214, the communications circuitry 208, the input/output circuitry 206, the processor 202, and/or the like, or a combination thereof, that identifies a feedback data set associated with an asset. As described herein, the feedback data set may embody data object(s) including an operational data value and a particular timestamp at which the asset was operating in accordance with the operational data value. In some embodiments, the apparatus 200 identifies the feedback data set by retrieving the feedback data set from one or more datastore(s) accessible to the apparatus 200. Alternatively or additionally, in some embodiments, the apparatus 200 identifies the feedback data set by capturing the command data via one or more sensor(s) associated with the asset, or receiving the command data in real-time from the sensor(s) associated with the asset or from the asset itself.

At operation 904, the apparatus 200 includes means such as the data intake circuitry 210, the data derivation & prediction circuitry 212, the degradation indicating circuitry 214, the asset commanding circuitry 214, the communications circuitry 208, the input/output circuitry 206, the processor 202, and/or the like, or a combination thereof, that identifies a command data set associated with the asset. As described, the command data set may embody data object(s) including a commanded data value and a particular corresponding timestamp at which the asset is commanded to be operating in accordance with the operational data value. In some embodiments, the apparatus 200 identifies the command data set from one or more datastore(s) accessible to the apparatus 200. Alternatively or additionally, in some embodiments, the apparatus 200 identifies the command data set by receiving command data as commands are transmitted to the asset. Alternatively or additionally, in some embodiments, the apparatus 200 identifies the command data set by receiving a command for an asset and deriving command data associated with each command initiated for the asset. The command data at a particular time may be predicted, derived, modeled, or otherwise determined utilizing any of a myriad of algorithm(s) for a particular asset and/or asset type, for example by the apparatus 200 or by a separate control system (e.g., a controller) that initiated the command. Additionally or alternatively, in some embodiments the apparatus 200 identifies the command data set by receiving command data from the asset itself or sensor(s) associated therewith.

In some embodiments, the apparatus 200 identifies real-time feedback data and/or real-time command data. In this regard, the apparatus 200 may process such data to determine whether the real-time operation of the asset associated with such data indicates degradation. For example, in some embodiments, the apparatus 200 processes the real-time feedback data and real-time command data to determine whether such data indicates the commanded value will be reached sufficiently quickly and/or with sufficient accuracy to indicate that the asset is operating in a non-degraded state, or otherwise not requiring maintenance to correct unacceptable performance of the asset. Alternatively or additionally, in some embodiments, the feedback data and/or command data represents historical data stored and retrieved at a subsequent time, for example at particular intervals at which a check for degradation is performed (e.g., every minute, hourly, daily, weekly, and/or the like).

At operation 906, the apparatus 200 includes means such as the data intake circuitry 210, the data derivation & prediction circuitry 212, the degradation indicating circuitry 214, the asset commanding circuitry 214, the communications circuitry 208, the input/output circuitry 206, the processor 202, and/or the like, or a combination thereof, that determines a delay value associated with a command event for the asset. In some embodiments, the delay value is generated based at least in part on the feedback data set and the command data set. For example, the apparatus 200 in some embodiments determines the delay value representing an absolute difference in timestamps for an update ending feedback value and an update ending command data determinable from the feedback data set and the command data set, representing an absolute delay value. Additionally or alternatively, in some embodiments, the delay value embodies or includes a normalized delay value generated utilizing any normalization algorithm, for example derived based at least in part on an absolute delay value and/or one or more other data value(s). In some embodiments, the normalized delay value is generated utilizing a normalization algorithm that adjusts absolute delay values to account for the range of the change compared to the full operational range for the asset. It will be appreciated that the any use of a delay value in the figures herein may include use of an absolute delay value, or alternatively include use of a normalized delay value.

At operation 908, the apparatus 200 includes means such as the data intake circuitry 210, the data derivation & prediction circuitry 212, the degradation indicating circuitry 214, the asset commanding circuitry 214, the communications circuitry 208, the input/output circuitry 206, the processor 202, and/or the like, or a combination thereof, that determines a command-feedback difference value associated with the asset. In some embodiments, the apparatus determines the command-feedback difference value based at least in part on a first portion of feedback data from the feedback data set and a first portion of command data from the command data set. The data portions may be associated with at least one timestamp determined as after an end of the command event. For example, the end of the command event may be determined by determining an update ending feedback value, and/or an update ending command data.

Alternatively or additionally, the apparatus 200 may receive data indicating a timestamp representing the end of the command event. In some embodiments, the command-feedback difference value is determined based at least in part on a difference between a data value of the update ending feedback data and a completed data value of the update ending command data.

At operation 910, the apparatus 200 includes means such as the data intake circuitry 210, the data derivation & prediction circuitry 212, the degradation indicating circuitry 214, the asset commanding circuitry 214, the communications circuitry 208, the input/output circuitry 206, the processor 202, and/or the like, or a combination thereof, that outputs at least one degradation indicator based at least in part on the delay value and/or the command-feedback difference value. The outputted at least one degradation indicator may indicate to a user that the asset is operating degraded past an unacceptable level, and/or what data value or insight indicates that the asset is operating degraded past an unacceptable level. In some embodiments, the at least one degradation indicator indicates whether the delay value, the command-feedback data value, or any data and/or data insights derived therefrom. In some embodiments, the at least one degradation indicators only indicate which data values and/or insight(s) indicate the asset is operating degraded past an unacceptable level. For example, in some embodiments the apparatus 200 compares the delay value, the command-feedback difference value, and/or any data insight derived therefrom with a particular corresponding threshold to generate and/or output a particular degradation indicator.

In some embodiments, the apparatus 200 determines at least one degradation indicator based at least in part on a relative comparison of the delay value and/or command-feedback difference value to other delay values and/or command-feedback difference values. For example, in some embodiments, the apparatus 200 determines whether such data indicates degradation relative to the same data values for other assets, such as assets of the same asset type. In some embodiments, for example, the apparatus 200 determines, sets, or identifies a threshold indicating degradation associated with a delay value and/or a command-feedback difference value based at least in part on such data corresponding to other assets of the same asset type. In this regard, it will be appreciated that the apparatus 200 may determine degradation based at least in part on one or more absolute determination(s), and/or one or more relative determination(s) to other assets.

Additionally or alternatively, in some embodiments, the apparatus 200 outputs at least one degradation indicator by generating and/or transmitting at least one notification comprising or based at least in part on the degradation indicator. Such notification(s) may be transmitted to a user device, for example for outputting via one or more display(s), audio output(s), and/or the like.

FIG. 10 illustrates a flowchart depicting operations of an example process for outputting a degradation indicator based at least in part on delay status data in accordance with at least some example embodiments of the present disclosure. Specifically, FIG. 10 depicts operations of an example process 1000. In some embodiments, the process 1000 is embodied by computer program code stored on a non-transitory computer-readable storage medium of a computer program product configured for execution to perform the process as depicted and described. Alternatively or additionally, in some embodiments, the process 1000 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with at least one apparatus, at least one sensor associated with the at least one apparatus, at least one end-user computing device, and/or in some embodiments an optional external control system. For purposes of simplifying the description, the process 1000 is described as performed by and from the perspective of the apparatus 200.

The process 1000 begins at operation 1002. In some embodiments, the process 1000 begins after one or more operations depicted and/or described with respect to any one of the other processes described herein. For example, in some embodiments as depicted, the process 1000 begins after execution of operation 908. In this regard, some or all of the process 1000 may replace or supplement one or more blocks depicted and/or described with respect to any of the processes described herein. Upon completion of the process 1000, the flow of operations may terminate. Additionally or alternatively, as depicted, upon completion of the process 1000 in some embodiments, flow may return to one or more operation(s) of another process, such as the operation 910. It will be appreciated that, in some embodiments, the process 1000 embodies a sub-process of one or more other process(es) depicted and/or described herein, for example the process 900.

At operation 1002, the apparatus 200 includes means such as the data intake circuitry 210, the data derivation & prediction circuitry 212, the degradation indicating circuitry 214, the asset commanding circuitry 214, the communications circuitry 208, the input/output circuitry 206, the processor 202, and/or the like, or a combination thereof, that compares a delay value and a delay threshold. The delay value may be associated with a particular asset, for example as described with respect to operation 906. In some embodiments, the apparatus 200 identifies the delay threshold based at least in part on an identifier associated with the asset, an asset type associated with the asset, and/or is predetermined. In this regard, the delay threshold may represent a cutoff that, if the delay value exceeded or otherwise satisfied, indicates that the asset is operating degraded past an acceptable level.

At operation 1004, the apparatus 200 includes means such as the data intake circuitry 210, the data derivation & prediction circuitry 212, the degradation indicating circuitry 214, the asset commanding circuitry 214, the communications circuitry 208, the input/output circuitry 206, the processor 202, and/or the like, or a combination thereof, that determines delay status data based at least in part on the comparison. For example, in some embodiments the delay status indicates a first data value (e.g., a "degraded" status) in a circumstance where the comparison indicates the delay value exceeds or otherwise satisfies the delay threshold. Additionally or alternatively, in some embodiments the apparatus 200 generates the delay status data indicates a second data value (e.g., an "okay" status) in a circumstance where the comparison indicates the delay value does not exceed or otherwise satisfy the delay threshold.

At operation 1006, the apparatus 200 includes means such as the data intake circuitry 210, the data derivation & prediction circuitry 212, the degradation indicating circuitry 214, the asset commanding circuitry 214, the communications circuitry 208, the input/output circuitry 206, the processor 202, and/or the like, or a combination thereof, that outputs the degradation indicator based at least in part on the delay status data. In some embodiments, the apparatus 200 generates the degradation indicator comprising a data value representing whether the delay status data indicates the apparatus is performing in a degraded manner past an acceptable level. Additionally or alternatively, in some embodiments, the data indicator includes or embodies data representing that the delay value as the reason for the determination that the asset is operating in a degraded manner past an acceptable level.

FIG. 11 illustrates a flowchart depicting operations of an example process for outputting a degradation indicator based at least in part on difference status data in accordance with at least some example embodiments of the present disclosure. Specifically, FIG. 11 depicts operations of an example process 1100. In some embodiments, the process 1100 is embodied by computer program code stored on a non-transitory computer-readable storage medium of a computer program product configured for execution to perform the process as depicted and described. Alternatively or additionally, in some embodiments, the process 1100 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with at least one apparatus, at least one sensor associated with the at least one apparatus, at least one end-user computing device, and/or in some embodiments an optional external control system. For purposes of simplifying the description, the process 1100 is described as performed by and from the perspective of the apparatus 200.

The process 1100 begins at operation 1102. In some embodiments, the process 1100 begins after one or more operations depicted and/or described with respect to any one of the other processes described herein. For example, in some embodiments as depicted, the process 1100 begins after execution of operation 908. In this regard, some or all of the process 1100 may replace or supplement one or more blocks depicted and/or described with respect to any of the processes described herein. Upon completion of the process 1100, the flow of operations may terminate. Additionally or alternatively, as depicted, upon completion of the process 1100 in some embodiments, flow may return to one or more operation(s) of another process, such as the operation 910. It will be appreciated that, in some embodiments, the process 1100 embodies a sub-process of one or more other process(es) depicted and/or described herein, for example the process 900.

At operation 1102, the apparatus 200 includes means such as the data intake circuitry 210, the data derivation & prediction circuitry 212, the degradation indicating circuitry 214, the asset commanding circuitry 214, the communications circuitry 208, the input/output circuitry 206, the processor 202, and/or the like, or a combination thereof, that compares a command-feedback difference value and a difference threshold. The command-feedback difference value may be associated with a particular asset, for example as described with respect to operation 908. In some embodiments, the apparatus 200 identifies the command-feedback difference value based at least in part on an identifier associated with the asset, an asset type associated with the asset, and/or is predetermined. In this regard, the difference threshold may represent a cutoff that, if the command-feedback difference value exceeded or otherwise satisfied, indicates that the asset is operating degraded past an acceptable level.

At operation 1104, the apparatus 200 includes means such as the data intake circuitry 210, the data derivation & prediction circuitry 212, the degradation indicating circuitry 214, the asset commanding circuitry 214, the communications circuitry 208, the input/output circuitry 206, the processor 202, and/or the like, or a combination thereof, that determines difference status based at least in part on the comparison. For example, in some embodiments, the command-feedback difference value indicates a first data value (e.g., a "degraded" status) in a circumstance where the comparison indicates the command-feedback difference value exceeds or otherwise satisfies the difference threshold. Additionally or alternatively, in some embodiments apparatus 200 generates the difference status data indicating a second data value (e.g., an "okay"/"not degraded" status) in a circumstance where the comparison indicates the command-feedback difference value does not exceed or otherwise satisfy the difference threshold.

At operation 1106, the apparatus 200 includes means such as the data intake circuitry 210, the data derivation & prediction circuitry 212, the degradation indicating circuitry 214, the asset commanding circuitry 214, the communications circuitry 208, the input/output circuitry 206, the processor 202, and/or the like, or a combination thereof, that outputs the degradation indicator based at least in part on the difference status data. In some embodiments, the apparatus 200 generates the degradation indicator comprising a data value representing whether the difference status data indicates the apparatus is performing in a degraded manner past an acceptable level. Additionally or alternatively, in some embodiments, the data indicator includes or embodies data representing that the command-feedback difference value as the reason for the determination that the asset is operating in a degraded manner past an acceptable level.

FIG. 12 illustrates a flowchart depicting operations of an example process for capturing feedback data in accordance with at least some example embodiments of the present disclosure. Specifically, FIG. 12 depicts operations of an example process 1200. In some embodiments, the process 1200 is embodied by computer program code stored on a non-transitory computer-readable storage medium of a computer program product configured for execution to perform the process as depicted and described. Alternatively or additionally, in some embodiments, the process 1200 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with at least one apparatus, at least one sensor associated with the at least one apparatus, at least one end-user computing device, and/or in some embodiments an optional external control system. For purposes of simplifying the description, the process 1200 is described as performed by and from the perspective of the apparatus 200.

The process 1200 begins at operation 1202. In some embodiments, the process 1200 begins after one or more operations depicted and/or described with respect to any one of the other processes described herein. In this regard, some or all of the process 1200 may replace or supplement one or more blocks depicted and/or described with respect to any of the processes described herein. Upon completion of the process 1200, the flow of operations may terminate. Additionally or alternatively, as depicted, upon completion of the process 1200 in some embodiments, flow may return to one or more operation(s) of another process, such as the operation 902. It will be appreciated that, in some embodiments, the process 1200 embodies a sub-process of one or more other process(es) depicted and/or described herein, for example the process 900.

At operation 1202, the apparatus 200 includes means such as the data intake circuitry 210, the data derivation & prediction circuitry 212, the degradation indicating circuitry 214, the asset commanding circuitry 214, the communications circuitry 208, the input/output circuitry 206, the processor 202, and/or the like, or a combination thereof, that captures, via at least one sensor, feedback data indicating a current operational value for an operational aspect of an asset. In some embodiments, the apparatus 200 captures the feedback data in real-time via the at least one sensor. Alternatively or additionally, in some embodiments, the apparatus 200 determines a current timestamp at the time that the feedback data is captured and/or received, and associates the current timestamp with the current operational value to generate the feedback data. Alternatively or additionally, in some embodiments, the sensor provides the feedback data including the current operational value as captured for the asset and the current timestamp at which such data was captured. In some embodiments, the apparatus 200 stores the feedback data to the feedback data set as it is captured.

At optional operation 1204, the apparatus 200 includes means such as the data intake circuitry 210, the data derivation & prediction circuitry 212, the degradation indicating circuitry 214, the asset commanding circuitry 214, the communications circuitry 208, the input/output circuitry 206, the processor 202, and/or the like, or a combination thereof, that determines, based at least in part on at least one command transmitted to an asset, command data associated with an operational aspect of an asset. In some embodiments, the apparatus 200 models and/or algorithmically processes the command to generate command data representing how the operational data value for an operational aspect of the asset is commanded to update for the particular asset. Alternatively or additionally, in some embodiments, the apparatus 200 determines the command data based on one or more predefined determination(s), lookup table(s), and/or the like based at least in part on one or more aspects of the command, such as how much an operational aspect value is to change within a range of operable values for the asset. In some embodiments, the apparatus 200 determines the command data and stores it to the command data set.

FIG. 13 illustrates a flowchart depicting operations of an example process for outputting a degradation indicator based at least in part on normalized delay value in accordance with at least some example embodiments of the present disclosure. Specifically, FIG. 13 depicts operations of an example process 1300. In some embodiments, the process 1300 is embodied by computer program code stored on a non-transitory computer-readable storage medium of a computer program product configured for execution to perform the process as depicted and described. Alternatively or additionally, in some embodiments, the process 1300 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with at least one apparatus, at least one sensor associated with the at least one apparatus, at least one end-user computing device, and/or in some embodiments an optional external control system. For purposes of simplifying the description, the process 1300 is described as performed by and from the perspective of the apparatus 200.

The process 1300 begins at operation 1302. In some embodiments, the process 1300 begins after one or more operations depicted and/or described with respect to any one of the other processes described herein, for example after the operation 908. In this regard, some or all of the process 1300 may replace or supplement one or more blocks depicted and/or described with respect to any of the processes described herein. Upon completion of the process 1300, the flow of operations may terminate. Additionally or alternatively, as depicted, upon completion of the process 1300 in some embodiments, flow may return to one or more operation(s) of another process, such as the operation 910. It will be appreciated that, in some embodiments, the process 1300 embodies a sub-process of one or more other process(es) depicted and/or described herein, for example the process 900.

At operation 1302, the apparatus 200 includes means such as the data intake circuitry 210, the data derivation & prediction circuitry 212, the degradation indicating circuitry 214, the asset commanding circuitry 214, the communications circuitry 208, the input/output circuitry 206, the processor 202, and/or the like, or a combination thereof, that determines, based at least in part on the delay value, a normalized delay value. In some embodiments, the normalized delay value represents a delay value normalized based at least in part on the range of operable values for the operational aspect of the asset. Additionally or alternatively, in some embodiments, the normalized delay value is generated based at least in part on distance from the commanded target value current operational value for the asset when a command is initiated (e.g., as indicated by update starting feedback data determined for the asset). In some embodiments, the apparatus 200 determines the normalized delay value utilizing a defined normalization algorithm that utilizes any desired data value available to the apparatus 200.

At operation 1304, the apparatus 200 includes means such as the data intake circuitry 210, the data derivation & prediction circuitry 212, the degradation indicating circuitry 214, the asset commanding circuitry 214, the communications circuitry 208, the input/output circuitry 206, the processor 202, and/or the like, or a combination thereof, that outputs a degradation indicator based at least in part on the normalized delay value. In some embodiments, the normalized delay value is processed in an identical manner to any delay value as described herein. In this regard, the normalized delay value may be compared with a corresponding delay threshold, utilized to derive delay trend data, and/or otherwise utilized to output degradation indicator(s) based at least in part on any such data and/or comparisons associated therewith. In some embodiments, use of the normalized delay value replaces use of the otherwise not normalized delay value as described herein.

FIG. 14 illustrates a flowchart depicting operations of an example process for generating a predicted time until a delay threshold is satisfied in accordance with at least some example embodiments of the present disclosure. Specifically, FIG. 14 depicts operations of an example process 1400. In some embodiments, the process 1400 is embodied by computer program code stored on a non-transitory computer-readable storage medium of a computer program product configured for execution to perform the process as depicted and described. Alternatively or additionally, in some embodiments, the process 1400 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with at least one apparatus, at least one sensor associated with the at least one apparatus, at least one end-user computing device, and/or in some embodiments an optional external control system. For purposes of simplifying the description, the process 1400 is described as performed by and from the perspective of the apparatus 200.

The process 1400 begins at operation 1402. In some embodiments, the process 1400 begins after one or more operations depicted and/or described with respect to any one of the other processes described herein, for example after the operation 908. In this regard, some or all of the process 1400 may replace or supplement one or more blocks depicted and/or described with respect to any of the processes described herein. Upon completion of the process 1400, the flow of operations may terminate. Additionally or alternatively, as depicted, upon completion of the process 1400 in some embodiments, flow may return to one or more operation(s) of another process, such as the operation 910. It will be appreciated that, in some embodiments, the process 1400 embodies a sub-process of one or more other process(es) depicted and/or described herein, for example the process 900.

At operation 1402, the apparatus 200 includes means such as the data intake circuitry 210, the data derivation & prediction circuitry 212, the degradation indicating circuitry 214, the asset commanding circuitry 214, the communications circuitry 208, the input/output circuitry 206, the processor 202, and/or the like, or a combination thereof, that generates delay trend data based at least in part on a delay value set. In some embodiments, the apparatus 200 maintains and/or otherwise identifies a delay value set comprising data objects including each determined absolute data value and a corresponding timestamp at which the absolute data value was determined. It should be appreciated that in some embodiments, the delay value set includes a set of normalized delay values.

In some embodiments, the apparatus 200 generates the delay trend data utilizing at least one algorithm, model, and/or other defined function. For example, the algorithm, model, and/or defined function may receive the delay value set and/or corresponding timestamps as input and define a relationship for the delay value set in accordance with the timeseries thereof. In some embodiments, for example, the delay trend data is generated using a threshold timing prediction model. Alternatively or additionally, in some embodiments the apparatus 200 utilizes a separate linear regression model, line of best fit determination algorithm, and/or the like. It should be appreciated that in some embodiments, the same model performs some or all of both the operations 1402 and 1404.

At operation 1404, the apparatus 200 includes means such as the data intake circuitry 210, the data derivation & prediction circuitry 212, the degradation indicating circuitry 214, the asset commanding circuitry 214, the communications circuitry 208, the input/output circuitry 206, the processor 202, and/or the like, or a combination thereof, that generates, using a threshold timing prediction model, a predicted time remaining until a delay threshold is satisfied based at least in part on the delay trend data. In some embodiments, the threshold timing prediction model determines a timestamp where a predicted delay value is to satisfy (e.g., by meeting or exceeding) the delay threshold. In some embodiments, the apparatus 200 determines the delay threshold based at least in part on user input, one or more predetermined data value(s), an asset identifier associated with the asset, an asset type associated with the asset, manufacturer specification data associated with the asset, and/or the like. In some embodiments, the threshold timing prediction model is embodied by a specially trained machine learning model trained based at least in part on the delay trend data, or alternatively trained based at least in part on the delay value set and corresponding timestamps. In some embodiments, the apparatus 200 further post-processes the data output via the threshold timing prediction model, for example in a circumstance where the threshold timing prediction model outputs an absolute timestamp and the apparatus 200 converts the timestamp to the time remaining by taking the difference between the output timestamp and a current timestamp.

FIG. 15 illustrates a flowchart depicting operations of an example process for generating a predicted time until a difference threshold is satisfied in accordance with at least some example embodiments of the present disclosure. Specifically, FIG. 15 depicts operations of an example process 1500. In some embodiments, the process 1500 is embodied by computer program code stored on a non-transitory computer-readable storage medium of a computer program product configured for execution to perform the process as depicted and described. Alternatively or additionally, in some embodiments, the process 1500 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with at least one apparatus, at least one sensor associated with the at least one apparatus, at least one end-user computing device, and/or in some embodiments an optional external control system. For purposes of simplifying the description, the process 1500 is described as performed by and from the perspective of the apparatus 200.

The process 1500 begins at operation 1502. In some embodiments, the process 1500 begins after one or more operations depicted and/or described with respect to any one of the other processes described herein, for example after the operation 908. In this regard, some or all of the process 1500 may replace or supplement one or more blocks depicted and/or described with respect to any of the processes described herein. Upon completion of the process 1500, the flow of operations may terminate. Additionally or alternatively, as depicted, upon completion of the process 1500 in some embodiments, flow may return to one or more operation(s) of another process, such as the operation 910. It will be appreciated that, in some embodiments, the process 1500 embodies a sub-process of one or more other process(es) depicted and/or described herein, for example the process 900.

At operation 1502, the apparatus 200 includes means such as the data intake circuitry 210, the data derivation & prediction circuitry 212, the degradation indicating circuitry 214, the asset commanding circuitry 214, the communications circuitry 208, the input/output circuitry 206, the processor 202, and/or the like, or a combination thereof, that generates difference trend data based at least in part on a command-feedback difference value set. In some embodiments, the apparatus 200 maintains and/or otherwise identifies a command-feedback difference value set comprising data object(s) including each determined command-feedback difference value and a corresponding timestamp at which the command-feedback difference value was determined. It should be appreciated that in some embodiments, the command-feedback difference value set includes a set of normalized command-feedback difference values.

In some embodiments, the apparatus 200 generates the difference trend data utilizing at least one algorithm, model, and/or other defined function. For example, the algorithm, model, and/or defined function may receive the command-feedback difference value set and/or corresponding timestamps as input and define a relationship for the command-feedback difference value set in accordance with the timeseries thereof. In some embodiments, for example, the difference trend data is generated using a threshold timing prediction model. Alternatively or additionally, in some embodiments the apparatus 200 utilizes a separate linear regression model, line of best fit determination algorithm, and/or the like. It should be appreciated that in some embodiments, the same model performs some or all of both the operations 1502 and 1504.

At operation 1504, the apparatus 200 includes means such as the data intake circuitry 210, the data derivation & prediction circuitry 212, the degradation indicating circuitry 214, the asset commanding circuitry 214, the communications circuitry 208, the input/output circuitry 206, the processor 202, and/or the like, or a combination thereof, that generates, using a threshold timing prediction model, a predicted time remaining until a difference threshold is satisfied based at least in part on the difference trend data. In some embodiments, the threshold timing prediction model determines a timestamp where a predicted command-feedback difference value is to satisfy (e.g., by meeting or exceeding) the difference threshold. In some embodiments, the apparatus 200 determines the difference threshold based at least in part on user input, one or more predetermined data value(s), an asset identifier associated with the asset, an asset type associated with the asset, manufacturer specification data associated with the asset, and/or the like. In some embodiments, the threshold timing prediction model is embodied by a specially trained machine learning model trained based at least in part on the difference trend data, or alternatively trained based at least in part on the command-feedback difference value set and corresponding timestamps. In some embodiments, the apparatus 200 further post-processes the data output via the threshold timing prediction model, for example in a circumstance where the threshold timing prediction model outputs an absolute timestamp and the apparatus converts the timestamp to the time remaining by taking the difference between the output timestamp and a current timestamp.

FIG. 16 illustrates a flowchart depicting operations of an example process for determining a delay value in accordance with at least some example embodiments of the present disclosure. Specifically, FIG. 16 depicts operations of an example process 1600. In some embodiments, the process 1600 is embodied by computer program code stored on a non-transitory computer-readable storage medium of a computer program product configured for execution to perform the process as depicted and described. Alternatively or additionally, in some embodiments, the process 1600 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with at least one apparatus, at least one sensor associated with the at least one apparatus, at least one end-user computing device, and/or in some embodiments an optional external control system. For purposes of simplifying the description, the process 1600 is described as performed by and from the perspective of the apparatus 200.

The process 1600 begins at operation 1602. In some embodiments, the process 1600 begins after one or more operations depicted and/or described with respect to any one of the other processes described herein, for example after the operation 904. In this regard, some or all of the process 1600 may replace or supplement one or more blocks depicted and/or described with respect to any of the processes described herein, for example operation 906 as depicted and described. Upon completion of the process 1600, the flow of operations may terminate. Additionally or alternatively, as depicted, upon completion of the process 1600 in some embodiments, flow may return to one or more operation(s) of another process, such as the operation 908. It will be appreciated that, in some embodiments, the process 1600 embodies a sub-process of one or more other process(es) depicted and/or described herein, for example the process 900.

At operation 1602, the apparatus 200 includes means such as the data intake circuitry 210, the data derivation & prediction circuitry 212, the degradation indicating circuitry 214, the asset commanding circuitry 214, the communications circuitry 208, the input/output circuitry 206, the processor 202, and/or the like, or a combination thereof, that determines a first timestamp associated with a first data value. In some embodiments, the apparatus 200 receives a feedback data set and cycles through each timestamp for which a portion of feedback data exists within the feedback data set, starting from the earliest timestamp represented in the feedback data set. Alternatively or additionally, in some embodiments, the apparatus 200 begins processing from a timestamp where a change in data value from one timestamp to the next is determined to fall below a tolerance threshold.

At optional operation 1604, the apparatus 200 includes means such as the data intake circuitry 210, the data derivation & prediction circuitry 212, the degradation indicating circuitry 214, the asset commanding circuitry 214, the communications circuitry 208, the input/output circuitry 206, the processor 202, and/or the like, or a combination thereof, that determines that, after the first timestamp, data values in a feedback data set remain within a tolerance threshold for a timestamp interval that satisfies a value updating time threshold. In some embodiments, the tolerance threshold is predetermined. Alternatively or additionally, in some embodiments, the tolerance threshold is set based at least in part on user input, an identifier associated with the asset corresponding to the feedback data set, an asset type associated with the asset corresponding to the feedback data set, a manufacturer specification associated with the asset corresponding to the feedback data set, and/or the like. Similarly, in some embodiments, the value updating time threshold is predetermined. Additionally or alternatively, in some embodiments, the apparatus 200 determines the value updating time threshold based at least in part on user input, an identifier associated with the asset corresponding to the feedback data set, an asset type associated with the asset corresponding to the feedback data set, a manufacturer specification associated with the asset corresponding to the feedback data set, and/or the like.

In some embodiments, the apparatus 200 identifies each portion of feedback data in the feedback data set that is associated with a timestamp within the value updating time threshold from the first timestamp. For example, in a circumstance where each portion of feedback data is associated with a timestamp 1 minute apart, and the value updating time threshold represents 3 minutes, the apparatus 200 identifies the three portions of feedback data associated with timestamps subsequent to the first timestamp. It will be appreciated as described herein that each portion of feedback data may be associated with a data value and a timestamp, such that the corresponding data values for each of such timestamps is similarly identifiable from the feedback data set.

In some embodiments, the apparatus 200 compares a difference between the first data value corresponding to the first timestamp and each data value for the identified portions of feedback data with the tolerance threshold. In a circumstance where any of the differences between the first data value and each data value for the identified portions of feedback data (e.g., associated with the subsequent timestamps within the value updating time threshold) is determined to exceed or otherwise not remain within the tolerance threshold, the apparatus 200 may update the first timestamp to a subsequent timestamp. Alternatively or additionally, in some embodiments or circumstances, for example where all timestamps have been processed, the apparatus 200 may determine that the asset is either still progressing towards the commanded target data value or otherwise sufficiently degraded. In a circumstance where the differences between the first data value and each data value for the identified portions of feedback data remain within the tolerance threshold, however, the apparatus 200 may determine that the asset has ceased sufficiently progressing towards a commanded target data value as of the first timestamp even in circumstances where the first data value does not equal the commanded target data value.

At operation 1606, the apparatus 200 includes means such as the data intake circuitry 210, the data derivation & prediction circuitry 212, the degradation indicating circuitry 214, the asset commanding circuitry 214, the communications circuitry 208, the input/output circuitry 206, the processor 202, and/or the like, or a combination thereof, that determines an update ending feedback data from the feedback data set, the update ending feedback data indicating the end of a command event. In some embodiments, the update ending feedback data comprises the first data value and corresponding first timestamp that was successfully determined at optional operation 1604. Alternatively or additionally, in some embodiments, the apparatus 200 receives an indication that identifies the update ending feedback data indicating the end of the command event. Alternatively or additionally still, in some embodiments, the apparatus 200 determines the update ending feedback data in a circumstance where the data value of such an update ending feedback data at a particular timestamp is equal to or within a particular threshold (e.g., the tolerance threshold) from a commanded target data value associated with the command event, for example.

At operation 1606, the apparatus 200 includes means such as the data intake circuitry 210, the data derivation & prediction circuitry 212, the degradation indicating circuitry 214, the asset commanding circuitry 214, the communications circuitry 208, the input/output circuitry 206, the processor 202, and/or the like, or a combination thereof, that determines the delay value based at least in part on the update ending feedback data. In some embodiments, for example, the apparatus 200 determines the delay value by taking the difference between the timestamp of or associated with the update ending feedback data and a corresponding update ending command data. As described herein, the update ending command data may be identified based at least in part on a determined timestamp at which the asset is commanded to have updated an operational value for an operational aspect to a commanded target data value from an initial data value. In some embodiments, the apparatus 200 determines the update ending command data, for example by modeling a command data set based at least in part on data associated with the command event, such as an initial command data value and/or initial feedback data value, a change in operational value associated with the command event, and/or the like. In this regard, the delay value may represent a determined difference between the time at which the asset is commanded to complete updating an operational aspect in accordance with the command event, and an actual time that the asset completed such updating, for outputting and/or further processing as described herein.

CONCLUSION

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An apparatus for indicating asset degradation, the apparatus comprising at least one processor and at least one non-transitory memory including computer-coded instructions thereon, the computer coded instructions, with the at least one processor, cause the apparatus to:

identify, by data intake circuitry of the apparatus, a command data set associated with an asset;

identify, by the data intake circuitry, a feedback data set associated with the asset, wherein the feedback data set is captured by at least one sensor associated with the asset;

determine, by data derivation and prediction circuitry of the apparatus, a delay value associated with a command event based at least in part on the feedback data set;

determine, by the data derivation and prediction circuitry, a command-feedback difference value in real-time based at least in part on a first portion of feedback data from the feedback data set and a first portion of command data from the command data set, the first portion of the feedback data and the first portion of the command data are associated with at least one timestamp determined as after an end of the command event; and output, by degradation indicating circuitry of the apparatus, a degradation indicator based at least in part on the delay value and/or the command-feedback difference value, wherein the output of the degradation indicator includes output of a maintenance notification associated with the asset to a user device, and the maintenance notification indicates that at least one of the asset requires maintenance and a remaining time until the asset should undergo the maintenance.

2. The apparatus according to claim 1, the apparatus further caused to:

determine, by the data derivation and prediction circuitry, delay status data based at least in part on comparison between the delay value and a delay threshold; and output, by the degradation indicating circuitry, the degradation indicator based at least in part on the delay status data.

3. The apparatus according to claim 1, the apparatus further caused to:

determine, by the data derivation and prediction circuitry, difference status data based at least in part on comparison between the command-feedback difference value and a difference threshold; and output, by the degradation indicating circuitry, the degradation indicator based at least in part on the difference status data.

4. The apparatus according to claim 1, wherein to identify the feedback data set, the apparatus is caused to:

capture by the data intake circuitry, the feedback data indicating a current operational value for an operational aspect of the asset.

5. The apparatus according to claim 4, wherein the at least one sensor captures the feedback data at a sampling rate based at least in part on an asset type associated with the asset.

6. The apparatus according to claim 1, the apparatus further caused to:

determine, by the data derivation and prediction circuitry, based at least in part on the delay value, a normalized delay value; and output, by the degradation indicating circuitry, the degradation indicator based at least in part on the normalized delay value.

7. The apparatus according to claim 1, the apparatus further caused to:

generate, by the data derivation and prediction circuitry, delay trend data based at least in part on the delay value; and generate, by the data derivation and prediction circuitry, using a threshold timing prediction model, a predicted time remaining until a delay threshold is satisfied based at least in part on the delay trend data.

8. The apparatus according to claim 7, wherein the threshold timing prediction model comprises at least one machine learning model trained to generate, based at least in part on the delay value, the predicted time remaining until the delay threshold is satisfied.

9. The apparatus according to claim 1, the apparatus further caused to:

generate, by the data derivation and prediction circuitry, difference trend data based at least in part on the command-feedback difference value; and generate, by the data derivation and prediction circuitry, using a threshold timing prediction model, a predicted time remaining until a difference threshold is satisfied based at least in part on the difference trend data.

10. The apparatus according to claim 9, wherein the threshold timing prediction model comprises at least one machine learning model trained to generate, based at least in part on the command-feedback difference value, the predicted time remaining until the difference threshold is satisfied.

11. The apparatus according to claim 1, the apparatus further caused to:

determine, by the data intake circuitry, an update ending feedback data from the feedback data set, the update ending feedback data indicating the end of the command event; and determine, by the data derivation and prediction circuitry, the delay value based at least in part on the update ending feedback data.

12. The apparatus according to claim 11, wherein determining the update ending feedback data comprises:

determine, by the data intake circuitry, a first timestamp associated with a first data value, wherein, after the first timestamp, data values in the feedback data set remain within a tolerance threshold for a timestamp interval that satisfies a value updating time threshold.

13. The apparatus according to claim 1, wherein the command data set comprises data values within a range of operable values associated with the asset.

14. The apparatus according to claim 1, wherein the feedback data set comprises the feedback data representing a speed of operation of the asset or a position of operation of the asset.

15. A computer-implemented method, comprising:

identifying, by data intake circuitry of an apparatus, a command data set associated with an asset;

identifying, by the data intake circuitry, a feedback data set associated with the asset, wherein the feedback data set is captured by at least one sensor associated with the asset;

determining, by data derivation and prediction circuitry of the apparatus, a delay value associated with a command event based at least in part on the feedback data set;

determining, by the data derivation and prediction circuitry, a command-feedback difference value in real-time based at least in part on a first portion of feedback data from the feedback data set and a first portion of command data from the command data set, the first portion of the feedback data and the first portion of the command data are associated with at least one timestamp determined as after an end of the command event; and outputting, by degradation indicating circuitry of the apparatus, a degradation indicator based at least in part on the delay value and/or the command-feedback difference value, wherein the output of the degradation indicator includes output of a maintenance notification associated with the asset to a user device, and the maintenance notification indicates that at least one of the asset requires maintenance and a remaining time until the asset should undergo the maintenance.

16. The computer-implemented method according to claim 15, the computer-implemented method further comprising:
    determining, by the data derivation and prediction circuitry, based at least in part on the delay value, a normalized delay value; and
    outputting, by the degradation indicating circuitry, the degradation indicator based at least in part on the normalized delay value.

17. The computer-implemented method according to claim 15, the computer-implemented method further comprising:
    generating, by the data derivation and prediction circuitry, delay trend data based at least in part on the delay value; and
    generating, by the data derivation and prediction circuitry, using a threshold timing prediction model, a predicted time remaining until a delay threshold is satisfied based at least in part on the delay trend data.

18. A computer program product comprising at least one non-transitory computer-readable storage medium having computer program code stored thereon that, in execution with at least one processor, is configured for:
    identifying a command data set associated with an asset;
    identifying a feedback data set associated with the asset, wherein the feedback data set is captured by at least one sensor associated with the asset;
    determining a delay value associated with a command event based at least in part on the feedback data set;
    determining a command-feedback difference value in real-time based at least in part on a first portion of feedback data from the feedback data set and a first portion of command data from the command data set, the first portion of the feedback data and the first portion of the command data are associated with at least one timestamp determined as after an end of the command event; and
    outputting a degradation indicator based at least in part on the delay value and/or the command-feedback difference value, and wherein the output of the degradation indicator includes output of a maintenance notification associated with the asset to a user device, and the maintenance notification indicates that at least one of the asset requires maintenance and a remaining time until the asset should undergo the maintenance.

19. The computer program product according to claim 18, the computer program product further configured for:
    determining, based at least in part on the delay value, a normalized delay value; and
    outputting the degradation indicator based at least in part on the normalized delay value.

* * * * *